United States Patent [19]

Bahler et al.

[11] 4,241,329
[45] Dec. 23, 1980

[54] CONTINUOUS SPEECH RECOGNITION METHOD FOR IMPROVING FALSE ALARM RATES

[75] Inventors: Lawrence G. Bahler, Somerville; Stephen L. Moshier, Cambridge, both of Mass.

[73] Assignee: Dialog Systems, Inc., Belmont, Mass.

[21] Appl. No.: 901,005

[22] Filed: Apr. 27, 1978

[51] Int. Cl.² ............................................. G10L 1/00
[52] U.S. Cl. .......................... 340/146.3 R; 179/1 SA
[58] Field of Search ................ 179/1 SA, 1 SB, 1 SC, 179/1 SD; 340/146.3 R, 146.3 Q, 146.3 AQ

[56] References Cited

U.S. PATENT DOCUMENTS

| | | | |
|---|---|---|---|
| 3,544,894 | 12/1970 | Hartwell et al. | 179/1 SA |
| 3,946,157 | 3/1976 | Dreyfus | 179/1 SA |
| 4,038,503 | 7/1977 | Moshier | 179/1 SA |

Primary Examiner—Leo H. Boudreau
Attorney, Agent, or Firm—Kenway & Jenney

[57] ABSTRACT

A speech recognition method for detecting and recognizing one or more keywords in a continuous audio signal is disclosed. Each keyword is represented by a keyword template representing one or more target patterns, and each target pattern comprises statistics of each of at least one spectrum selected from plural short-term spectra generated according to a predetermined system for processing of the incoming audio. The incoming audio spectra are compared with the target patterns of the keyword templates and candidate keywords are selected according to a predetermined decision process. In post-decision processing, concatentation techniques, based upon a likelihood ratio test, for rejecting false alarms are disclosed. Post-decision processing can include also a prosodic test to enhance the effectiveness of the recognition apparatus.

14 Claims, 30 Drawing Figures

SPIN3M

Control must return here for every real time input frame, i.e., every 10 ms to get new frame from hardware autocorrelator. NXTFRM performs preprocessing to yield time smoothed, equalized, and log-transformed 32 word spectra in the "JIN" buffer, with the 32nd word containing the amplitude. Also produced is a buffer of subjective time for each frame, "JARC." After NXTFRM preprocessing, "PICK" routine chooses 3 frames to form a pattern, and 3 loops are made through likelihood calculating and pattern sequence tracking logic from "NXTFR" to just before "RETURN". "RETURN" sets up to return control back here to NXTFRM.

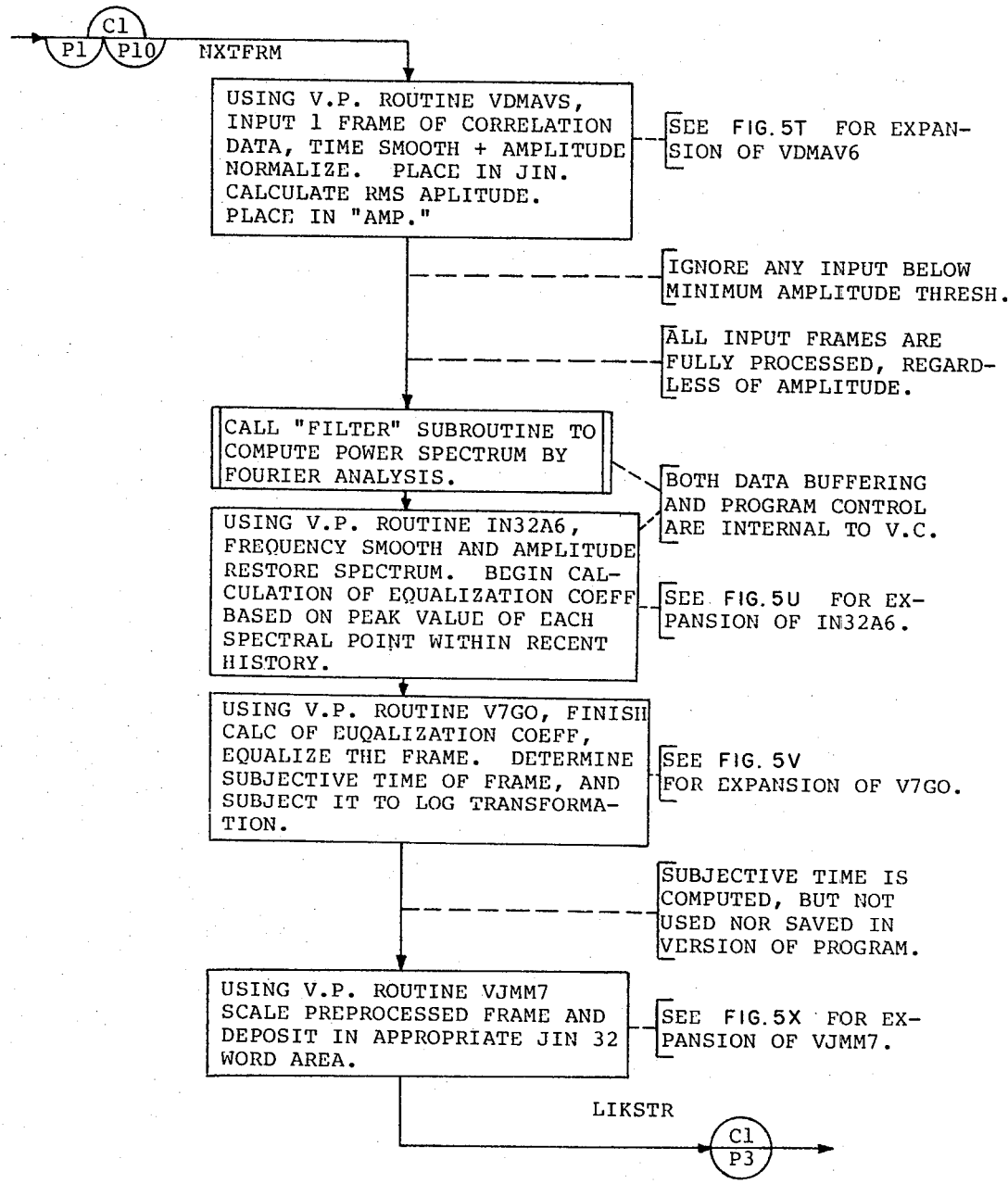

FIG. 5A

SPIN3M V.P. ROUTINES
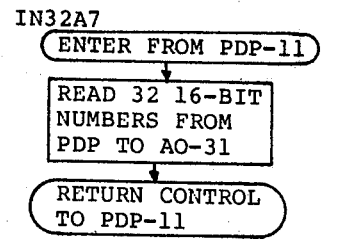
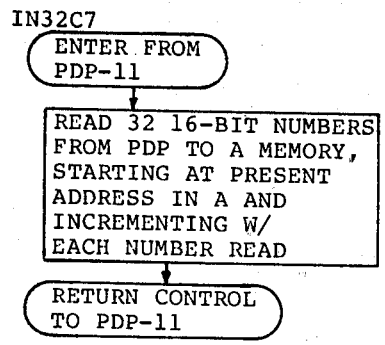
FIG. 5S

SPIN3M V.P. ROUTINES

V7G0 (ENTER FROM PDP-11)

— 2ND STEP OF CALCULATION OF EQUALIZATION COEFFICIENTS:

THE OBJECT IS TO FIND A SCALE FACTOR, R, SUCH THAT
  R*MAX(SMOOTHED) PEAK ARRAY)
    =MAX(UNSMOOTHED PEAK ARRAY)
THIS MAXIMUM RATIO IS CLEARLY THE MAXIMUM RATIO OF ANY POINT IN THE CURRENT AMPLITUDE RESTORED HAMMED SPECTRUM FRAME TO THE CORRESPONDING SMOOTHED PK ARRAY POINT. THUS IF WE SCALE THE SMOOTHED PEAK ARRAY BY A MULTIPLICATIVE FACTOR OF R/C, ALL VALUES OF THE EQUALIZED FRAME, I.E., HAMMED SPECTRUM DIVIDED BY SCALED SMOOTHED PK ARRAY, WILL LIE BETWEEN 0 AND C. THIS ALLOWS UTILIZATION OF FULL RANGE OF THE ARITHMETIC UNIT.

— DEFAULT VALUE (8) FOR R IS NOW USED, BECAUSE APRIORI KNOWLEDGE GIVES R<7.

V7G0
FOR $S_i$ ELEMENT OF SMOOTHED PEAK ARRAY IN B32-63 $(R/C)S_i \rightarrow S_i$, RESULTS LEFT IN B32-63.

— 3RD AND FINAL STEP OF CALCULATION OF EQUALIZATION COEFFICIENTS:
WITH INCREASED PRECISION, MULTIPLY SMOOTHED PEAK ARRAY BY RATIO R/C TO YIELD 32 EQUALIZATION COEFFICIENTS.

VDIYST
DIVIDE AMPLITUDE RESTORED HAMMED SPECTRUM FRAME AT A0-31 BY EQUALIZATION COEFF. AT B32-63, RESULT GOES TO P0-31.

— EQUALIZE CURRENT AMPLITUDE RESTORED HAMMED SPECTRUM FRAME TO YIELD "EQUALIZED FRAME." EACH POINT OF AMP RESTORED HAMMED SPECTRUM FRAME IS DIVIDED BY CORRESPONDING COEFF IN EQUALIZATION ARRAY.

VAV2
COMPUTE AVERAGE OF 32 INTEGERS, AT A0-31, RESULT IN A31.

— FIND THE AMPLITUDE OF THE EQUALIZED SIGNAL, AND REPLACE 32ND SPECTRUM (4 KHZ) WITH THIS VALUE.

SPIN3M V.P. ROUTINES

VCLK7

( ENTER FROM PDP-11 )

↓

COMPUTE THE DIF-
FERENCES BETWEEN
TEST PATTERN VALUES
$x_i$ IN A0-95 AND
REFERENCE PATTERN
MEAN VALUES $u_i$ IN
PDP-11 STATISTICS
BUFFER:
FOR i=0→95,
$A_i - u_i \rightarrow B_i$

↓

( RETURN CONTROL TO PDP-11 )

VCLK7 ENTERED WITH V.P. BUS ADDRESS
REGISTER POINTING TO REFERENCE
PATTERN MEAN VALUES.

THESE STEPS ARE TO CALC. LIKELIHOOD
THAT THE THREE FRAMES IN A MEMORY
ARE SAME PATTERN AS ONE CURRENTLY
SOUGHT. FOR A SOUGHT PATTERN WHOSE
REFERENCE PAT. MEAN VALUES ARE $u_i$,
i=0->95, AND STANDARD DEV. VALUES
ARE $\sigma_i$ i=0->95, LIKELIHOOD P THAT
PATTERN WITH VALUES $x_i$ IS SAME AS
REFERENCE PATTERN IS GIVEN BY $$P = K \left[ \sum_{i=0}^{95} ((x_i - u_i) 1_{\sigma_i})^2 \right] + L$$

WHERE K IS A SCALE FACTOR AND L
IS A LOG OFFSET TERM. P IS INVERSELY
RELATED TO CLOSENESS OF FIT OF TEST
PATTERN TO REFERENCE PATTERN.

VCLK27

( ENTER FROM PDP-11 )

↓

MULTIPLY DIFFERENCES
IN B0-95 BY INVERSES
OF STANDARD DEVIATIONS
AND SQUARE. ACCUMULATE
SQUARES IN V.P. "F"
REGISTER. FOR i=0→95, $$F + \left[ \frac{B_i}{\sigma_i} \right]^2 \rightarrow F$$

F→B0

↓

ADD LOG OFFSET TERM FROM
PDP STATISTICS TO ACCUMU-
LATED SQUARES IN B0:
B0+L→F

↓

SCALE LIKELIHOOD IN F
BY CONSTANT K
K*F→F

↓

( RETURN CONTROL TO PDP-11 )

VCLK27 ENTERED W/ V.P. BUS ADDRESS
REGISTER POINTING TO MULTIPLICATIVE
INVERSES OF REFERENCE PATTERN
STANDARD DEVIATIONS.

BOTH MEAN VALUES AND INVERSE
STANDARD DEVIATIONS ARE BUFFERED
IN D-MEMORY AT LOCATION VSTAT=2600.

IN STATISTICS BUFFER, FOLLOWING
STANDARD DEVIATIONS, IS A LOG
OFFSET TERM GENERATED BY THE SUM
OF THE LOGS OF STANDARD DEVIATIONS
FOR POINTS IN THIS 96 POINT PATTERN.

FIG. 5Y

CONTINUOUS SPEECH RECOGNITION METHOD FOR IMPROVING FALSE ALARM RATES

The invention herein described was made in the course of or under a contract with the Department of the Air Force.

BACKGROUND OF THE INVENTION

The present invention relates to a speech recognition method and more particularly to a method for recognizing in real time one or more keywords in a continuous audio signal.

Various speech recognition systems have been proposed herebefore to recognize isolated utterances by comparing an unknown isolated audio signal, suitably processed, with one or more previously prepared representations of the known keywords. In this context, "keywords" is used to mean a connected group of phonemes and sounds and may be, for example, a portion of a syllable, a word, a phrase, etc. While many systems have met with limited success, one system, in particular, has been employed successfully, in commercial applications, to recognize isolated keywords. That system operates substantially in accordance with the method described in U.S. Pat. No. 4,038,503, granted July 26, 1977, assigned to the assignee of this application, and provides a successful method for recognizing one of a restricted vocabulary of keywords provided that the boundaries of the unknown audio signal data are either silence or background noise as measured by the recognition system. That system relies upon the presumption that the interval, during which the unknown audio signal occurs, is well defined and contains a single utterance.

In a continuous audio signal, such as continuous conversational speech, wherein the keyword boundaries are not a priori known or marked, several methods have been devised to segment the incoming audio data, that is, to determine the boundaries of linguistic units, such as phonemes, syllables, words, sentences, etc., prior to initiation of a keyboard recognition process. These prior continuous speech systems, however, have achieved only a limited success in part because a satisfactory segmenting process has not been found. Other substantial problems still exist; for example, only limited vocabularies can be consistently recognized with a low false alarm rate, the recognition accuracy is highly sensitive to the differences between voice characteristics of different talkers, and the systems are highly sensitive to distortion in the audio signals being analyzed, such as typically occurs, for example, in audio signals transmitted over ordinary telephone communications apparatus. Thus, even though continuous speech is easily discernible and understood by the human observer, machine recognition of even a limited vocabulary of keywords in a continuous audio signal has yet to achieve major success.

A speech analysis system which is effective in recognizing keywords in continuous speech in described and claimed in copending application Ser. No. 901,001, filed Apr. 27, 1978, entitled Continuous Speech Recognition Method. That system employs a method in which each keyword is characterized by a template consisting of an ordered sequence of one of more target patterns and each target pattern represents a plurality of short-term keyword power spectra spaced apart in time. Together, the target patterns cover all important acoustical events in the keyboard. The invention claimed in U.S. Ser. No. 901,001 features a frequency analysis method comprising the steps of repeatedly evaluating a set of parameters determining a short-term power spectrum of the audio signal at each of a plurality of equal duration sampling intervals, thereby generating an uninterrupted time-ordered sequence of short-term, audio power spectrum frames; and repeatedly selecting from the sequence of short-term power spectrum frames, one first frame and at least one later occurring frame to form a multi-frame spectral pattern. The method further features the steps of comparing preferably using a likelihood statistic, each thus formed multi-frame pattern with each first target pattern of each keyword template; and deciding whether each multi-frame pattern corresponds to one of the first target patterns of the keyword templates. For each multi-frame pattern which, according to the deciding step, corresponds to a first target pattern of a potential candidate keyword, the method features selecting later occurring frames to form later occurring multi-frame patterns. The method then features the steps of deciding in a similar manner whether the later multi-frame patterns correspond respectively to successive target patterns of the potential candidate keyword, and identifying a candidate keyword when a selected sequence of milti-frame patterns corresponds respectively to the target patterns of a keyboard template, designated the selected keyword template.

Even though the method claimed in copending application Ser. No. 901,001 is significantly more effective in recognizing keywords in continuous speech than the prior art systems, even that method falls short of the desired goals.

A principal object of the present invention is therefore a speech recognition method having improved effectiveness in recognizing keywords in a continuous, unmarked audio signal. Other objects of the invention are a method which is adapted for improving the effectiveness of a given system and in particular the discrimination of a system against false alarms. Yet further objects of the invention are a method which will respond equally well to different speakers and hence different voice characteristics, a method which is reliable, a method which will operate in real time, and a method which can be adapted to existing recognition methods.

SUMMARY OF THE INVENTION

The invention relates to a speech analysis system for recognizing at least one predetermined keyword in an audio input signal. Each keyword is characterized by a template consisting of an ordered sequence of one or more target patterns. Each target pattern represents at least one short-term keyword power spectrum, or frame. Together, the target patterns cover all important acoustical events in the keyboard. The invention features a frequency analysis method comprising the steps of selecting a sequence of patterns, each pattern consisting of one or more frames; identifying a candidate keyword when the sequence of selected patterns corresponds respectively to the sequence of target patterns of a keyboard template, designated the selected keyword template; and applying a post-decision processing method for improving the false alarm rate.

The post-decision processing method, in one aspect, features the steps of normalizing the time duration spacings between the selected patterns corresponding to the candidate keyword target patterns, and applying a prosodic test to the normalized time duration spacings, wherein the normalized time spacings for a candidate keyword must meet the timing criteria imposed by the prosodic test. Unless this test is satisfied, the candidate keyword, in the illustrated embodiment, is not accepted as a recognized keyword. In preferred embodiments, the criteria comprise applying a likelihood statistic function to the normalized spacings and accepting the candidate word if the likelihood statistic exceeds a predetermined minimum value. In a second embodiment the criteria comprise applying fixed, predetermined spacing limits to each normalized spacing, and accepting the candidate word only if the normalized spacings fall within the fixed limits.

In another aspect of the post-decision processing method of the invention, there are featured the steps of applying a likelihood statistic function to the sequence of selected patterns corresponding to a candidate word to determine a figure of merit for each of the patterns, accumulating the figures of merit for the patterns, and accepting the candidate word if the accumulated figure of merit exceeds a predetermined minimum value.

In a preferred aspect, the invention relates to a speech analysis system for recognizing at least one predetermined keyword in a continuous, boundaryless audio input signal. Each keyword is characterized by a template consisting of an ordered sequence of one or more target patterns. Each target pattern represents at least one short-term keyword power spectrum. Together, the target patterns cover all important acoustical events in the keyword. The invention features an analysis method comprising the steps of repeatedly evaluating a set of parameters determining a short-term power spectrum of the audio signal within each of a plurality of equal duration sampling interals thereby generating an uninterrupted time-ordered sequence of short-term, audio power spectrum frames; and repeatedly selecting from the sequence of short-term power spectrum frames, one first frame and at least one later occurring frame to form a multi-frame spectral pattern. The method further features the steps of comparing, preferably using a likelihood statistic, each thus formed multi-frame pattern with each first target pattern of each keyword template, and deciding whether each multi-frame pattern corresponds to one of the first target patterns of the keyword templates. For each multi-frame pattern which, according to the deciding step, corresponds to a first target pattern of a potential candidate keyword, the method features selected later occurring frames to form later occurring multi-frame patterns. The method then features the steps of deciding in a similar manner whether the later multi-frame patterns correspond respectively to successive target patterns of the potential candidate keyword, and identifying a candidate keyword when a sequence of selected multi-frame patterns corresponds respectively to the target patterns of a keyword template, designated the selected keyword template. There are further featured post-decision processing method steps to improve the false alarm rate of the method. In one aspect, the post-decision processing method features the steps of normalizing the time duration spacings between the multi-frame patterns corresponding to the selected candidate keyword and applying the prosodic test to the normalized time duration spacings whereby the normalized time spacings for a candidate keyword must meet the timing criteria imposed by the prosodic test. Unless this test is satisfied, the candidate keyword, in the illustrated embodiment, is not accepted as a recognized keyword.

In another aspect of the post-decision processing method of the invention, there are featured the steps of applying a likelihood ratio test to the sequence of selected multi-frame patterns corresponding to a candidate word to determine a figure of merit for each of the patterns, accumulating the figures of merit for the patterns, and accepting the candidate word if the accumulated figure of merit exceeds a predetermined minimum value.

BRIEF DESCRIPTION OF THE DRAWINGS

Other objects, features, and advantages of the invention will appear from the following description of a preferred embodiment taken together with the drawings in which.

Corresponding reference characters indicate corresponding parts throughout the several views of the drawings.

DESCRIPTION OF A PREFERRED EMBODIMENT

In the particular preferred embodiment which is described herein, speech recognition is performed by an overall apparatus which involves both a specially constructed electronic system for effecting certain analog and digital processing of incoming audio data signals, generally speech, and a general purpose digital computer which is programmed in accordance with the present invention to effect certain other data reduction steps and numerical evaluations. The division of tasks between the hardware portion and the software portion of this system has been made so as to obtain an overall system which can accomplish speech recognition in real time at moderate cost. However, it should be understood that some of the tasks being performed in hardware in this particular system could well be performed in software and that some of the tasks being performed by software programming in this example might also be performed by special purpose circuitry in a different embodiment of the invention.

Figure 1:
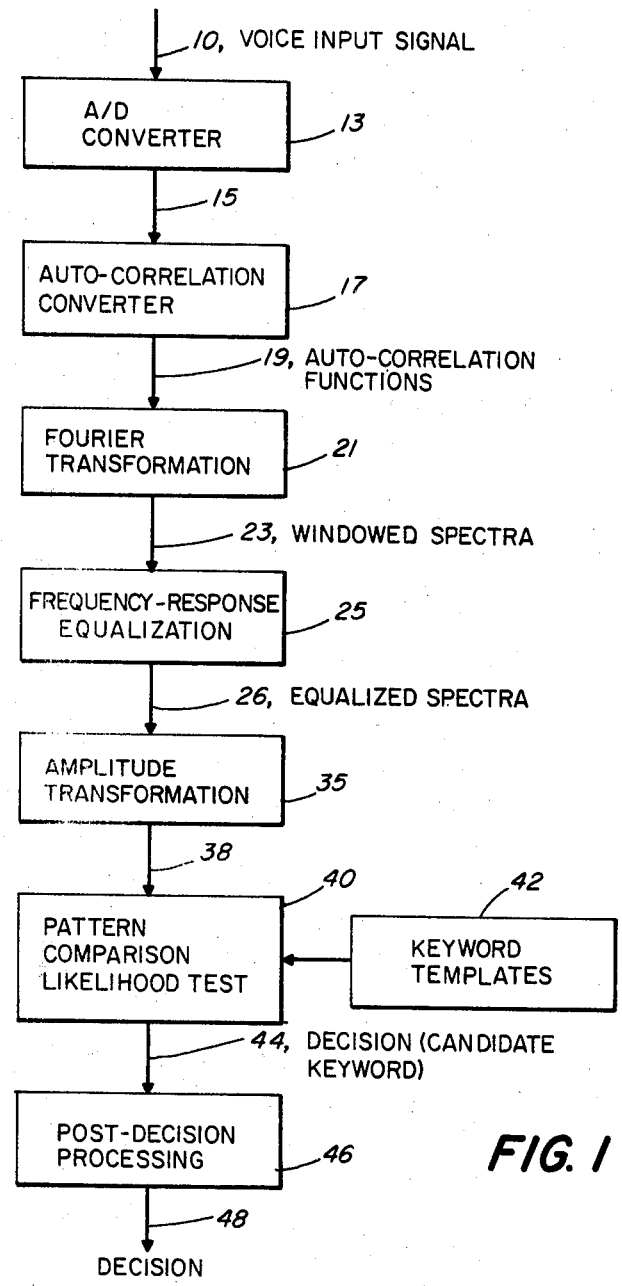
FIG. 1 is a flow chart illustrating in general terms the sequence of operations performed in accordance with the practice of the present invention.

As indicated previously, one aspect of the present invention is the provision of apparatus which will recognize keywords in continuous speech signals even though those signals are distorted, for example, by a telephone line. Thus, referring in particular to FIG. 1, the voice input signal, indicated at 10, may be considered a voice signal, produced by a certain element telephone transmitter and received over a telephone line encompassing any arbitrary distance or number of switching interchanges. A typical application of the invention is therefore recognized keywords in audio data from an unknown source received over the telephone system. On the other hand, the input signal may also be any audio data signal, for example, a voice input signal, taken from a radio telecommunications link, for example, from a commercial broadcast station or from a private dedicated communications link.

As will become apparent from the description, the present method and apparatus are concerned with the recognition of speech signals containing a sequence of sounds or phonemes, or other recognizable indicia. In the description herein, and in the claims, reference is made to either "a keyboard," "a sequence of target patterns," "a template pattern," or "a keyword template," the four terms being considered as generic and equivalent. This is a convenient way of expressing a recognizable sequence of audio sounds, or representations thereof, which the method and apparatus can detect. The terms should be broadly and generically construed to encompass anything from a single phoneme, syllable, or sound to a series of words (in the grammatical sense) as well as a single word.

An alalog-to-digital (A/D) converter 13 receives the incoming analog audio signal data on line 10 and converts the signal amplitude of the incoming data to a digital form. The illustrated A/D converter is designed to convert the input signal data to a twelve-bit binary representation, the conversions occurring at the rate of 8,000 conversions per second. The A/D converter 13 applies its output over lines 15 to an autocorrelator 17. The autocorrelator 17 processes the digital input signals to generate a short-term autocorrelation function 100 times per second and applies its output, as indicated, over lines 19. Each autocorrelation function comprises 32 valves or channels, each value being calculated, to a 30-bit resolution. The autocorrelator is described in greater detail hereinafter with reference to FIG. 2.

The autocorrelation functions over lines 19 are Fourier transformed by Fourier transformation apparatus 21 to obtain the corresponding short-term windowed power spectra over lines 23. The spectra are generated at the same repetition rate as the autocorrelation functions, that is, 100 per second, and each short-term power spectrum has thirty-one numerical terms having a resolution of 16 bits each. As will be understood, each of the thirty-one terms in the spectrum represents the signal power within a frequency band. The Fourier transformation apparatus also preferably includes a Hamming or similar window function to reduce spurious adjacentband responses.

Figure 3:
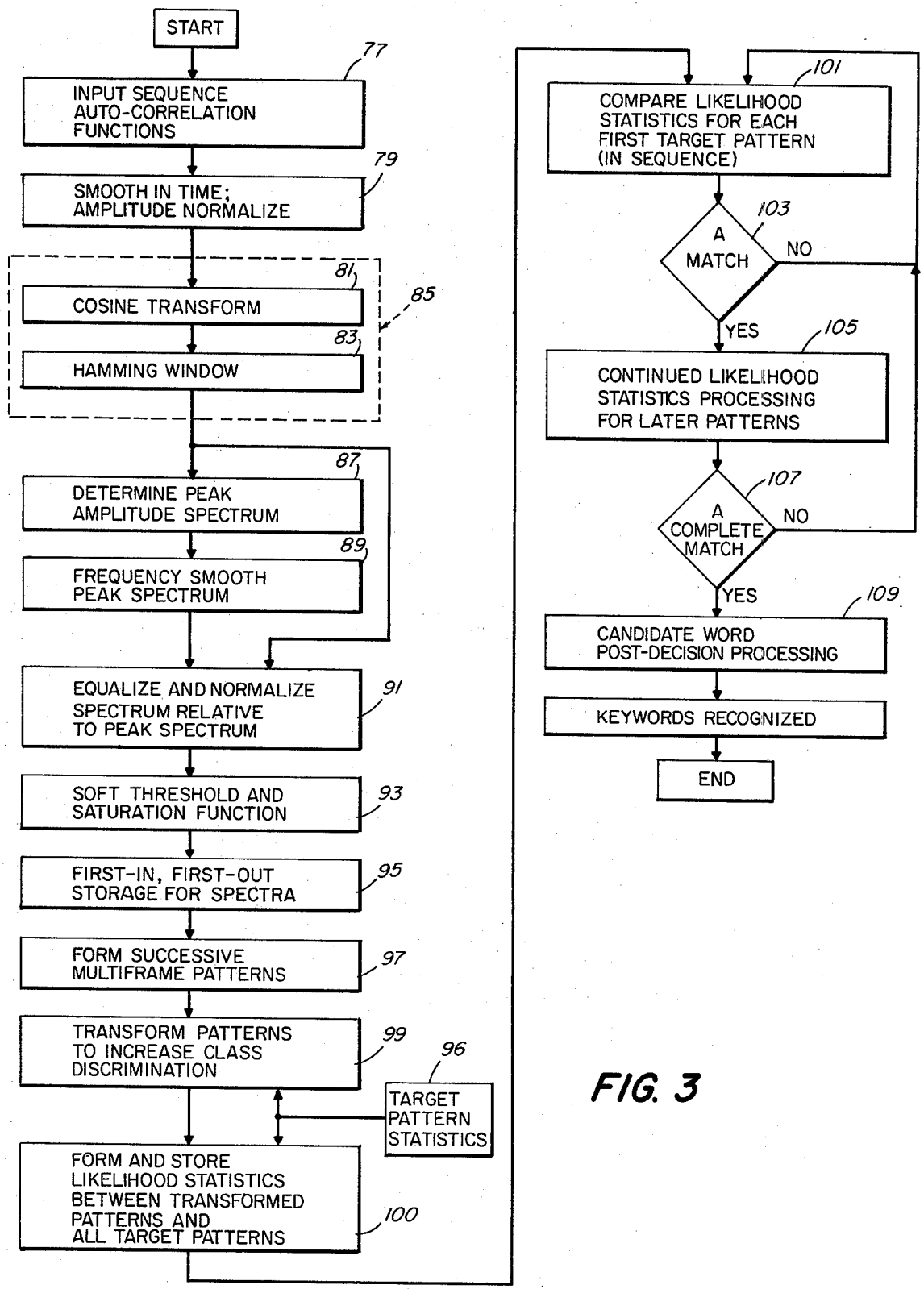
FIG. 3 is a flow diagram of a digital computer progrem performing certain procedures in the process of FIG. 1.

In the illustrated embodiment, the Fourier transformation as well as subsequent processing steps are performed under the control of a general purpose digital computer, appropriately programmed, utilizing a peripheral array processor for speeding the arithmetic operations required repetitively according to the present method. The particular computer employed is a model PDP-11 manufactured by the Digital Equipment Corporation of Maynard, Mass. The particular array processor employed is described in copending U.S. patent application Ser. No. 841,390. The programming described hereinafter with reference to FIG. 3 is substantially predetermined upon the capabilities and characteristics of these commercially available digital processing units.

The short-term windowed power spectra are frequency-response equalized, as indicated at 25, equalization being performed as a function of the peak amplitudes occurring in each frequency band or channel as described in greater detail hereinafter. The frequency-response equalized spectra, over lines 26, are generated at the rate of 100 per second and each spectrum has thirty-one numerical terms evaluated to 16 bit accuracy. To facilitate the final evaluation of the incoming audio data, the frequency-response equalized and windowed spectra over lines 26 are subjected to an amplitude transformation, as indicated at 35, which imposes a non-linear amplitude transformation on the incoming spectra. This transformation is described in greater detail hereinafter, but it may be noted at this point that it improves the accuracy with which the unknown incoming audio signal may be matched with keywords in a reference vocabulary. In the illustrated embodiment, this transformation is performed on all of the frequency-response equalized and windowed spectra at a time prior to the comparison of the spectra with keyword templates representing the keywords in the reference vocabulary.

The amplitude transformed and equalized short-term spectra over lines 38 are then compared against the keyword templates at 40. The keyword templates, designated at 42, represent the keywords of the reference vocabulary in a spectral pattern with which the transformed and equalized spectra can be compared. Candidate words are thus selected according to the closeness of the comparison; and in the illustrated embodiment, the selection process is designed to minimize the likelihood of a missed keyword while rejecting grossly inapplicable pattern sequences. The candidate words (and accumulated statistics relating to the corresponding incoming data) are applied over lines 44 for post-decision processing at 46 to reduce the false alarm rate. The final decision is indicated at 48. The post-decision processing, which includes the use of a prosodic mask and/or an acoustic-level likelihood ratio sheet, improves the discrimination between correct detections and false alarms as described in more detail below.

Preprocessor

Figure 2:
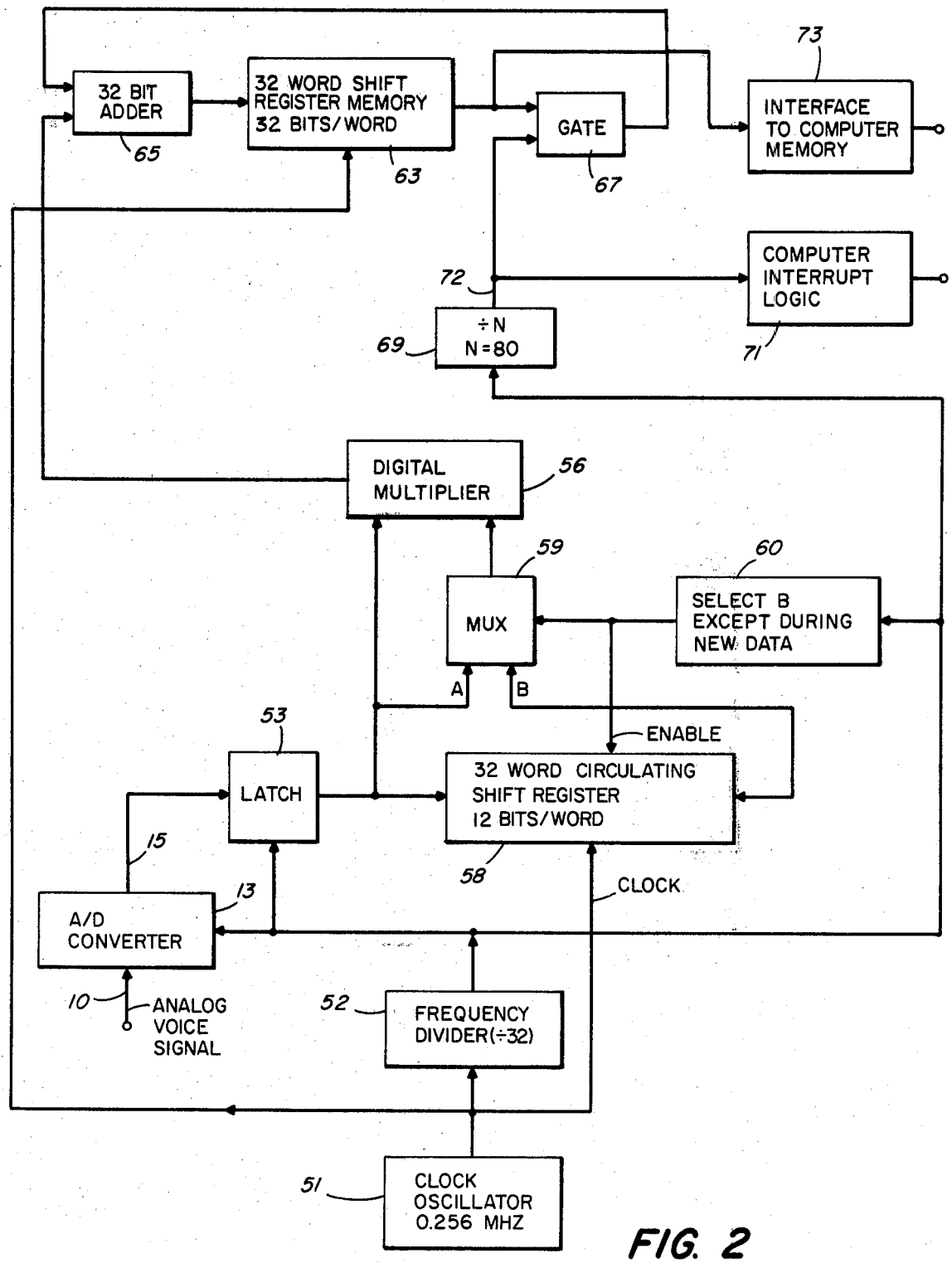
FIG. 2 is a schematic block diagram of electronic apparatus for performing certain preprocessing operations in the overall process illustrated in FIG. 1.

In the apparatus illustrated in FIG. 2, an autocorrelation function with its intrinsic averaging is performed digitally on the digital data stream generated by the analog-to-digital converter 13 from the incoming analog audio data over line 10 generally a voice signal. The converter 13 provides a digital input signal over lines 15. The digital processing functions as well as the input analog-to-digital conversion, are timed under the control of a clock oscillator 51. The clock oscillator provides a basic timing signal at 256,000 pulses per second and this signal is applied to a frequency divider 52 to obtain a second timing signal at 8,000 pulses per second. The slower timing signal controls the analog-to-digital converter 13 together with a latch register 53 which holds the twelve-bit results of the last conversion until the next conversion is completed.

The autocorrelation products are generated by a digital multiplier 56 which multiplies the number contained in a register 53 by the output of a thirty-two word shift register 58. Shift register 58 is operated in a recirculating mode and is driven by the faster clock frequency, so that one complete circulation of the shift register data is accomplished for each analog-to-digidal conversion. An input to shift register 58 is taken from register 53 once during each complete circulation cycle. One input to the digital multiplier 56 is taken directly from the latch register 53 while the other input to multiplier is tekan (with one exception described below) from the current output of the shift register through a multiplexer 59. The multiplications are performed at the high clock frequency.

Thus, each value obtained from the A/D conversion is multiplies with each of the preceeding 31 conversion values. As will be understood by those skilled in the art, the signals thereby generated are equivalent to multiplying the input signal by itself, delayed in time by 32 different time increments (one of which is the zero delay). To produce the zero delay correlation, that is, the power of the signal, multipliexer 59 causes the current value of the latch register 53 to be multiplied by itself at the time each new value is being introduced into the shift register. This timing function is indicated at 60.

As will be understood by those skilled in the art, the products from a single conversion, together with its 31 predecessors, will not be fairly representative of the energy distribution or spectrum over a reasonable sampling interval. Accordingly, the apparatus of FIG. 2 provides for averaging of these sets of products.

An accumulation process, which effects averaging, is provided by a thirty-two word shift register 63 which is interconnected with an added 65 to form a set of thirty-two accumulators. Thus, each word can be recirculated after having been added to the corresponding increment from the digital multiplier. The circulation loop passes through a gate 67 which is controlled by a divide-by-N divider circuit 69 driven by the low frequency clock signal. The divider 69 divides the lower frequency clock by a factor which determines the number of instantaneous autocorrelation functions which are accumulated, and thus averaged, before the shift register 63 is read out.

In the illustrated example, eighty samples are accumulated before being read out. In other words, N for the divide-by-N divider circuit 69 is equal to eighty. After eighty conversion samples have thus been correlated and accumulated, the divider circuit 69 triggers a computer interrupt circuit 71 over a line 72. At this time, the contents of the shaft register 63 are successively read into the computer memory through a suitable interface circuitry 73, the thirty-two successive words in the register being presented in ordered sequence to the computer through the interface 73. As will be understood by those skilled in the art, this data transfer from a peripheral unit, the autocorrelator preprocessor, to the computer may be typically performed by a direct memory access procedure. Predicated on an averaging of eighty samples, at an initial sampling rate of 8,000 samples per second, it will be seen that 100 averaged autocorrelation functions are provided to the computer every second.

While the shift register contents are being read out to the computer, the gate 67 is closed so that each of the words in the shift register is effectively reset to zero to permit the accumulation process to begin again.

Expressed in mathematical terms, the operation of the apparatus shown in FIG. 2 can be described as follows. Assuming that the analog-to-digital converter generates the time series S(t), where t=0, $T_o$, $2T_o$, ..., and $T_o$ is the sampling interval (1/8000 sec. in the illustrated embodiment), the illustrated digital correlation circuitry of FIG. 2 may be considered, ignoring start-up ambiguities, to compute the autocorrelation function $$\Psi(j,t) = \sum_{k=1}^{80} S(t - kT_o)S(t - (k+j)T_o) \quad \text{(Equation 1)}$$

where j=0, 1, 2, ..., 31; t=80 $T_o$, 160 $T_o$, ..., 80n $T_o$, ... These autocorrelation functions correspond to the correlation output on lines 19 of FIG. 1.

Referring now to FIG. 3, the digital correlator operates continuously to transmit to the computer a series of data blocks at the rate of one complete autocorrelation function every ten milliseconds. This is indicated at 77 (FIG. 3). Each block of data represents the autocorrelation function derived from a corresponding subinterval of time. As noted above, the illustrated autocorrelation functions are provided to the computer at the rate of one hundred, 32-word functions per second.

In the illustrated embodiment, the processing of the autocorrelation function data is performed by an appropriately programmed, special purpose digital computer. The flow chart, which includes the function provided by the computer program is given in FIG. 3. Again, however, it should be pointed out that various of the steps could also be performed by hardware rather than software and that likewise certain of the functions performed by the apparatus of FIG. 2 could additionally be performed in the software by a corresponding revision of the flow chart of FIG. 3.

Although the digital correlator of FIG. 2 performs some time-averaging of the autocorrelation functions generated on an instantaneous basis, the average autocorrelation functions read out to the computer may still contain some anomalous discontinuities or unevenness which might interfere with the orderly processing and evaluation of the samples. Accordingly, each block of data, that is, each autocorrelation function $\psi(j,t)$, is first smoothed with respect to time. This is indicated in the flow chart of FIG. 3 at 79. The preferred smoothing process is one in which the smoothed autocorrelation output $\psi_s(j,t)$ is given by $$\psi_s(j,t) = C_0\psi(j,t) + C_1\psi(j,t-T) + C_2\psi(j,t+T) \quad \text{(Equation 2)}$$

where $\psi(j,t)$ is the unsmoothed input autocorrelation defined in Equation 1, $\psi_s(j,t)$ is the smoothed autocorrelation output, j denotes the delay time, t denotes real time, and T denotes the time interval between consecutively generated autocorrelation functions (equal to 0.01 second in the preferred embodiment). The weighting functions $C_0$, $C_1$, $C_2$, are preferably chosen to be ½, ¼, ¼ in the illustrated embodiment, although other values could be chosen. For example, a smoothing function approximating a Gaussian impulse response with a frequency cutoff of say, 20 Hertz could have been implemented in the computer software. However, experiments indicate that the illustrated, easier to implement, smoothing function provides satisfactory results. As indicated, the smoothing function is applied separately for each value j of delay.

As indicated at 81, a cosine Fourier transform is then applied to each time smoothed autocorrelation function, $\psi_s(j\text{-}t)$, to generate a 31 point spectrum. The power spectrum is defined as $$S(f,t) = \Psi_s(0, t)W(0) + 2\sum_{j=1}^{31} \Psi_s(j,t) W(j)\cos\frac{2\pi fj}{8000} \quad \text{(Equation 3)}$$

where S(f,t) is the spectral energy in a band centered at f Hz, at time t;

$$W(j) = \frac{1}{2}(1 + \cos\frac{2\pi j}{63})$$

is the Hamming window function to reduce side lobes; $\psi_s(j,t)$ is the smoothed autocorrelation function at delay j and time t; and $$f = 30 + 1000\,(0.0552m + 0.438)^{1/.063}\,\text{Hz};\, m = 1, 2, \ldots, 31 \qquad \text{(Equation 4)}$$

which are frequencies equally spaced on the "mel" scale of pitch. As will be understood, this corresponds to a subjective pitch (mel scale) frequency-axis spacing for frequencies in the bandwidth of a typical communication channel of about 300–3500 Hertz. As will also be understood, each point or value within each spectrum represents a corresponding band of frequencies. While this Fourier transform can be performed completely within the conventional computer hardware, the process may be speeded considerably if an external hardware multiplier or Fast Fourier Transform (FFT) peripheral device is utilized. The construction and operation of such modules are well known in the art, however, and are not described in detail herein. Advantageously built into the hardware Fast Fourier Transform peripheral device is a frequency smoothing function wherein each of the spectra are smoothed in frequency according to the preferred Hamming window weighting function W (j) defined above. This is indicated at 83 of the block 85 which corresponds to the hardware Fourier transform implementation.

As successive smoothed power spectra are received from the Fast Fourier Transform peripheral 85, a communication channel equalization function is obtained by determining a (generally different) peak power spectrum for each incoming windowed power spectrum from peripheral 85, and modifying the output of the Fast Fourier Transform apparatus accordingly, as described below. Each newly generated peak amplitude spectrum y (f,t), corresponding to an incoming windowed power spectrum S (f,t), where f is indexed over the plural frequency bands of the spectrum, is the result of a fast attack, slow decay, peak detecting function for each of the spectrum channels or bands. The windowed power spectra are normalized with respect to the respective terms of the corresponding peak amplitude spectrum. This is indicated at 87.

According to the illustrated embodiment, the values of the "old" peak amplitude spectrum y(f,t-t), determined prior to receiving a new windowed spectrum, are compared on a frequency band by frequency band basis with the new incoming spectrum S(f,t). The new peak spectrum y(f,t) is then generated according to the following rules. The power amplitude in each band of the "old" peak amplitude spectrum is multiplied by a fixed fraction, for example, 511/512, in the illustrated example. This corresponds to the slow decay portion of the peak detecting function. If the power amplitude in a frequency band f of the incoming spectrum S(f,t) is greater than the power amplitude in the corresponding frequency band of the decayed peak amplitude spectrum, then the decayed peak amplitude spectrum value for that (those) frequency band(s) is replaced by the spectrum value of the corresponding band of the incoming windowed spectrum. This corresponds to the fast attack portion of the peak detecting function. Mathematically, the peak detecting function can be expressed as $$y(f,t) = \max\{y(f,t-T)\cdot(1-E),\, S(f,t)\} \qquad \text{(Equation 5)}$$

where f is indexed over each of the frequency bands, y(f,t) is the resulting peak spectrum, y(f,t−T) is the "old" or previous peak spectrum, S(f,t) is the new incoming power spectrum, and E is the decay parameter. After the peak spectrum is generated, the resulting peak amplitude spectrum is frequency smoothed at 89 by averaging each frequency bank peak value with peak values corresponding to adjacent frequencies of the newly generated peak spectra, the width of the overall band of frequencies contributing to the average value being approximately equal to the typical frequency separation between formant frequencies. As will be understood by those skilled in the speech recognition art, this separation is in the order of 1000 Hz. By averaging in this particular way, the useful information in the spectra, that is, the local variations revealing formant resonances are retained whereas overall or gross emphasis in the frequency spectrum is suppressed. The resulting smoothed peak amplitude spectrum y(f,t) is then employed to normalize and frequency equalize the just received power spectrum, S(f,t), by dividing the amplitude value of each frequency band of the incoming smoothed spectrum S(f,t), by the corresponding frequency band value in the smoothed peak spectrum y(f,t). Mathematically, this corresponds to $$S_n(f,t) = S(f,t)/y(f,t) \qquad \text{(Equation 6)}$$

where $S_n(f,t)$ is the peak normalized smoothed power spectrum and f is indexed over each of the frequency bands. This step is indicated at 91. There results a sequence of frequency equalized and normalized short-term power spectra which emphasizes changes in the frequency content of the incoming audio signals while suppressing any generalized long-term frequency emphasis or distortion. This method of frequency compensation has been found to be highly advantageous in the recognition of speech signals transmitted over frequency distorting communication links such as telephone lines, in comparison to the more usual systems of frequency compensation in which the basis for compensation is the average power level, either in the whole signal or in each respective frequency band.

It is useful to point out that, while successive spectra have been variously processed and equalized, the data representing the incoming audio signals still comprises spectra occurring at a rate of 100 per second.

The normalized and frequency equalized spectra, indicated at 91, are subjected to an amplitude transformation, indicated at 93, which effects a non-linear scaling of the spectrum amplitude values. Designating the individual equalized and normalized spectra as $S_n(f,t)$ (from Equation 6) where f indexes the different frequency bands of the spectrum and t denotes real time, the non-linearly scaled spectrum x(f,t) is the linear fraction function $$x(f,t) = \frac{S_n(f,t) - A}{S_n(f,t) + A} \qquad \text{(Equation 7A)}$$

where A is the average value of the spectrum $S_n(f,t)$ defined as follows:

$$A = \frac{1}{31} \sum_{f_b=1}^{31} S_n(f_b, t) \quad \text{(Equation 7B)}$$

where $f_b$ indexes over the frequency bands of the power spectrum.

This scaling function produces a soft threshold and gradual saturation effect for spectral intensities which deviate greatly from the short-term average A. Mathematically, for intensities near the average, the function is approximately linear; for intensities further from the average it is approximately logarithmic; and at the extreme values of intensity, it is substantially constant. On a logarithmic scale, the function $x(f,t)$ is symmetric about zero and the function exhibits threshold and saturation behavior that is suggestive of an auditory nerve firing-rate function. In practice, the overall recognition system performs significantly better with this particular non-linear scaling function than it does with either a linear or a logarithmic scaling of the spectrum amplitudes.

There is thus generated a sequence of amplitude transformed, frequency-response equalized, normalized, short-term power spectra $x(f,t)$ where t equals 0.01, 0.02, 0.03, 0.04, . . . , seconds, and f=1, . . . , 31 (corresponding to the frequency bands of the generated power spectra). Thirty-two words are provided for each spectrum; and the value of A (Equation 7B), the average value of the spectrum values, is stored in the thirty-second word. The amplitude transformed, short-term power spectra are stored, as indicated at 95, in a first-in, first-out circulating memory having storage capacity, in the illustrated embodiment, for 256 thirty-two-word sepctra. There is thus made available for analysis, 2.56 seconds of the audio input signal. This storage capacity provides the recognition system with the flexibility required to select spectra at different real times, for analysis and evaluation and thus with the ability to go forward and backward in time as the analysis requires.

Thus, the amplitude power spectra for the last 2.56 seconds are stored in the circulating memory and are available as needed. In operation, in the illustrated embodiment, each amplitude transformed power spectrum is stored for 2.56 seconds. Thus, a spectrum, which enters the circulating memory at time $t_1$, is lost or shifted from the memory 2.56 seconds later as a new amplitude transformed spectrum, corresponding to a time $t_1+2.56$, is stored.

The transformed and equalized short-term power spectra passing through the circulating memory are compared, preferably in real time, against a known vocabulary of keywords to detect or pick out those keywords in the continuous audio data. Each vocabulary keyword is represented by a template pattern statistically representing a plurality of processed power spectra formed into plural non-overlapping multi-frame (preferably three spectra) design set patterns. These patterns are preferably selected to best represent significant acoustical events of the keywords.

The spectra forming the design set patterns are generated for keywords spoken in various contexts using the same system described hereinabove for processing the continuous unknown speech input on line 10 as shown in FIG. 3.

Thus, each keyword in the vocabulary has associated with it a generally plural sequence of design set patterns, $P(i)_1, P(i)_2, \ldots$, which represent, in a domain of short-term power spectra, one designation of that $i^{th}$ keyword. The collection of design set patterns for each keyword form the statistical basis from which the target patterns are generated.

In the illustrated embodiment of the invention, the design set patterns $P(i)_j$ can each be considered a 96 element array comprising three selected short-term power spectra arranged in a series sequence. The power spectra forming the pattern should preferably be spaced at least 30 milliseconds apart to avoid spurious correlation due to time domain smoothing. In other embodiments of the invention, other sampling strategies can be implemented for choosing the spectra; however the preferred strategy is to select spectra spaced by a constant time duration, preferably 30 milliseconds, and to space the non-overlapping design set patterns throughout the time interval defining the keyword. Thus, a first design set pattern $P_1$ corresponds to a portion of a keyword near its beginning, a second pattern $P_2$ corresponds to a portion later in time, etc., and the patterns $P_1, P_2, \ldots$ form the statistical basis for the series or sequence of target patterns, the keyword template, against which the incoming audio data will be matched. The target patterns $t_1, t_2, \ldots$, each comprise the statistical data, assuming the $P(i)_j$ are comprised of independent Gaussian variables, which enable a likelihood statistic to be generated between selected multi-frame patterns, defined below, and the target patterns. Thus, the target patterns consist of an array where the entries comprise the mean, standard deviation and area normalization factor for the corresponding collection of design set pattern array entires. A more refined likelihood statistic is described below.

It will be obvious to those skilled in the art that substantially all keywords will have more than one contextual and/or regional pronounciation and hence more than one "spelling" of design set patterns. Thus, a keyword having the patterned spelling $P_1, P_2, \ldots$ referred to above, can in actuality be generally expressed as $p(i)_1, p(i)_2, \ldots i=1, 2, \ldots, M$ where each of the $p(i)_j$ are possible alternative descriptions of the $j^{th}$ class of design set patterns, there being a total of M different spellings for the keyword.

The target patterns $t_1, t_2, \ldots, t_i, \ldots$, in the most general sense, therefore, each represent plural alternative statistical spellings for the $i^{th}$ group or class of design set patterns. In the illustrated embodiment described herein, the term "target patterns" is thus used in the most general sense and each target pattern may therefore have more than one permissible alternative "statistical spelling."

Processing the Stored Spectra

The stored spectra, at 95, representing the incoming continuous audio data, are compared with the stored template of target patterns indicated at 96, representing keywords of the vocabulary according to the following method. Each successive transformed, frequency-response equalized spectrum is treated as a first spectrum member of a multi-frame pattern, here a three spectrum pattern which corresponds to a 96-element vector. The second and third spectrum members of the pattern, in the illustrated embodiment, correspond to spectra occurring 30 and 60 milliseconds later (in real time). In the resulting pattern, indicated at 97, then, the first selected spectrum forms the first 32 elements of the vector, the second selected spectrum forms the second 32 elements of the vector, and the third selected spectrum forms the third 32 elements of the vector.

Preferably, each thus formed multi-frame pattern is transformed according to the following methods to reduce cross-correlation and decrease dimensionality, and to enhance the separation between target pattern classes. This is indicated at 99. The transformed patterns in the illustrated embodiment are then applied as inputs to a statistical likelihood calculation, indicated at 100, which computes a measure of the probability that the transformed pattern matches a target pattern.

Pattern Transformation

Considering first the pattern transformation, and using matrix notation, each multi-frame pattern can be represented by a 96-by-1 column vector $x = (x_1, x_2, \ldots, x_{96})$, where $x_1, x_2, \ldots, x_{32}$ are the elements $x(f, t_1)$ of the first spectrum frame of the pattern, $x_{33}, x_{34}, \ldots, x_{64}$ are the elements $x(f, t_2)$ of the second spectrum frame of the pattern, and $x_{65}, x_{66}, \ldots, x_{96}$ are the elements $x(f, t_3)$ of the third spectrum frame. Experimentally most of the elements $x_i$ of the vector x are observed to have probability distributions that are clustered symmetrically about their mean values so that a Gaussian probability density function closely fits the distribution of each $x_i$ ranging over samples from a particular collection of design set patterns corresponding to a particular target pattern. However, many pairs $x_i$, $x_j$ of elements are found to be significantly correlated, so that an assumption to the effect that the elements of x are mutually independent and uncorrelated would be unwarranged. Moreover, the correlations between elements arising from different frames in the multi-frame pattern convey information about the direction of motion of formant resonances in the input speech signal, and this information remains relatively constant even though the average frequencies of the formant resonances may vary, as from talker to talker. As is well known, the directions of motion of formant resonance frequencies are important cues for human speech perception.

As is well known, the effect of cross correlations among the elements of x can be taken into account by employing the multivariate Gaussian log likelihood statistic $$-L = \tfrac{1}{2}(x-\bar{x})K^{-1}(x-\bar{x})^t + \tfrac{1}{2}\ln ||K|| \qquad \text{(Equation 8A)}$$

where $\bar{x}$ is the sample mean of x, K is the matrix of sample covariances between all pairs of elements of x defined by $$K_{ij} = \overline{(x_i - \bar{x}_i)(x_j - \bar{x}_j)}, \qquad \text{(Equation 8B)}$$

and $||K||$ denotes the determinant of the matrix K. The covariance matrix K can be decomposed by well-known methods into an eigenvector representation $$K = EVE^t \qquad \text{(Equation 8C)}$$

where E is the matrix of eigenvectors $e_i$ of K, and V is the diagonal matrix of eigenvalues $v_i$ of K. These quantities are defined by the relation $$Ke_i^t = v_i e_i^t \qquad \text{(Equation 8D)}$$

Multiplication by the matrix E corresponds to a rigid rotation in the 96-dimensional space in which the vectors x are represented. Now if a transformed vector w is defined as $$w = E(x - \bar{x})^t \qquad \text{(Equation 8E)}$$

then the likelihood statistic can be rewritten as $$-L = \tfrac{1}{2} w V^{-1} w^t + \tfrac{1}{2}\ln ||K|| \qquad \text{(Equation 8F)}$$
$$= \tfrac{1}{2}\sum_{i=1}^{96}\left(\frac{w_i^2}{v_i} + \ln v_i\right)$$

Each eigenvalue $v_i$ is the statistical variance of the random vector x measured in the direction of eigenvector $e_i$.

The parameters $K_{ij}$ and $\bar{x}_i$ are determined, in the illustrated embodiment, by averaging formed multi-frame patterns, for each of the indicated statistical functions, over a number of observed design set samples. This procedure forms statistical estimates of the expected values of $K_{ij}$ and $x_i$. However, the number of independent parameters to be estimated is 96 mean values plus $96 \times 97/2 = 4656$ covariances. Since it is impractical to collect more than a few hundred design set pattern samples for a target pattern, the achievable number of sample observations per statistical parameter is evidently quite small. The effect of insufficient sample size is that chance fluctuations in the parameter estimates are comparable to the parameters being estimated. These relatively large fluctuations induce a strong statistical bias on the classification accuracy of the decision processor based on equation 8F, so that although the processor may be able to classify the samples from its own design set patterns with high accuracy, the performance measured with unknown data samples will be quite poor.

It is well known that by reducing the number of statistical parameters to be estimated, the effect of small sample bias is reduced. To that end, the following method has been commonly employed to reduce the dimensionality of a statistical random vector. The eigenvectors $e_i$ defined above are ranked by decreasing order of their associated eigenvalues $v_i$, to form a ranked matrix $E^r$ of ranked eigenvectors $e^r$ so that $e^r_1$ is the direction of maximum variance $v^r_1$ and $v^r_{i+1} \leq v^r_i$. Then the vector $x - \bar{x}$ is transformed into a vector w as in equation 8E, (using the ranked matrix $E^r$), but only the first p elements of w are utilized to represent the pattern vector x. In this representation, sometimes termed "principal component analysis," the effective number of statistical parameters to be estimated would be in the order of 96p instead of 4656. To classify patterns the likelihood statistic L is computed as in equation 8F except that the summation now ranges from 1 to p instead of from 1 to 96. On applying the principal component analysis method to practical data it is observed that the classification accuracy of the processor increases as p increases, until at a critical value of p the accuracy is a maximum; thereafter the accuracy diminishes as p is increased until the poor performance described above is observed at p=96. (See FIG. 4, graph (a) (training set data) and graph (b) (unknown input data)).

The maximum classification accuracy achieved by the principal component method is still limited by a small sample statistical bias effect, and the number of components, or dimensions, required is much larger than one would expect is really necessary to represent the data. Furthermore it can be seen from the illustration (FIG. 4) that the performance for design set pattern samples is actually worse than the performance for unknown samples, over a wide range of p.

The source of the latter two effects is found in the fact that by representing the sample space with p components of the transformed vector w, the contribution of the remaining 96-p components has been left out of the likelihood statistic L. A region where most of the pattern samples are found has thus been described, but the regions where few samples occur has not been described. The latter regions correspond to the tails of the probability distribution and thus to the regions of overlap between the different target pattern classes. The prior art method thus eliminates the very information needed to make the most difficult classification decisions. Unfortunately these regions of overlap are of high dimensionality, so it is impractical to reverse the argument above and employ, for example, a small number of the components of w for which the variance $v_i$ is smallest instead of largest.

According to the present invention, the effect of the unutilized components $w_{p+1}, \ldots, w_{96}$ is estimated by a reconstruction statistic R in the following manner. The terms dropped out of the expression for L (Equation 8F) contain the squares of the components $w_i$, each weighted in accordance with its variance $v_i$. All these variances can be approximated by a constant parameter c, which can then be factored out thus $$\sum_{i=p+1}^{96} \frac{w_i^2}{v_i} \sim c \sum_{i=p+1}^{96} w_i^2. \quad \text{(Equation 8G)}$$

The summation on the right is just the square of the Euclidean norm (length) of the vector $$w' = (w_{p+1}, \ldots, w_{96}). \quad \text{(Equation 8H)}$$

Define the vector $w^p$ to be $$w^p = (w_1, \ldots, w_p). \quad \text{(Equation 8I)}$$

Then $$\sum_{i=p+1}^{96} w_i^2 = |w'|^2 = |w|^2 - |w^p|^2, \quad \text{(Equation 8J)}$$

since the vectors w, w' and $w^p$ can be translated so as to form a right triangle. The eigenvector matrix E produces an orthogonal transformation, so the length of w is the same as the length of $x - \bar{x}$. Therefore it is not necessary to compute all the components of w. The statistic sought, which estimates the effect of the unutilized components upon the log likelihood function L, is thus $$R = (|x - \bar{x}|^2 - |w^p|^2)^{\frac{1}{2}} \quad \text{(Equation 8K)}$$

This is the length of the difference between the observed vector $x - \bar{x}$ and the vector that would be obtained by attempting to reconstruct $x - \bar{x}$ as a linear combination of the first p eigenvectors $e_i$ of K. R therefore has the character of a reconstruction error statistic. To utilize R in the likelihood function it may simply be adjoined to the set of transformed vector components to produce a new random vector $(w_1, w_2, \ldots, w_p, R)$ which is assumed to have independent Gaussian components. Under this assumption the new likelihood statistic is $$-L' = \frac{1}{2} \sum_{i=1}^{p} \frac{(w_i - \bar{w}_i)^2}{var(w_i)} + \frac{1}{2} \sum_{i=1}^{p} \ln var(w_i) + M \quad \text{(Equation 8L)}$$

where $$M = \frac{1}{2} \frac{(R - \bar{R})^2}{var(R)} + \frac{1}{2} \ln var(R) \quad \text{(Equation 8M)}$$

and the barred variables are sample means and var( ) denotes the unbiased sample variance. In Equation 8L the value of $\bar{w}_i$ should be zero, and $var(w_i)$ should be equal to $v_i$; however the eigenvectors cannot be computed or applied with infinite arithmetic precision, so it is best to remeasure the sample means and variances after transformation to reduce the systematic statistical bias produced by arithemetic roundoff errors. This remark applies also to Equation 8F.

Figure 4:
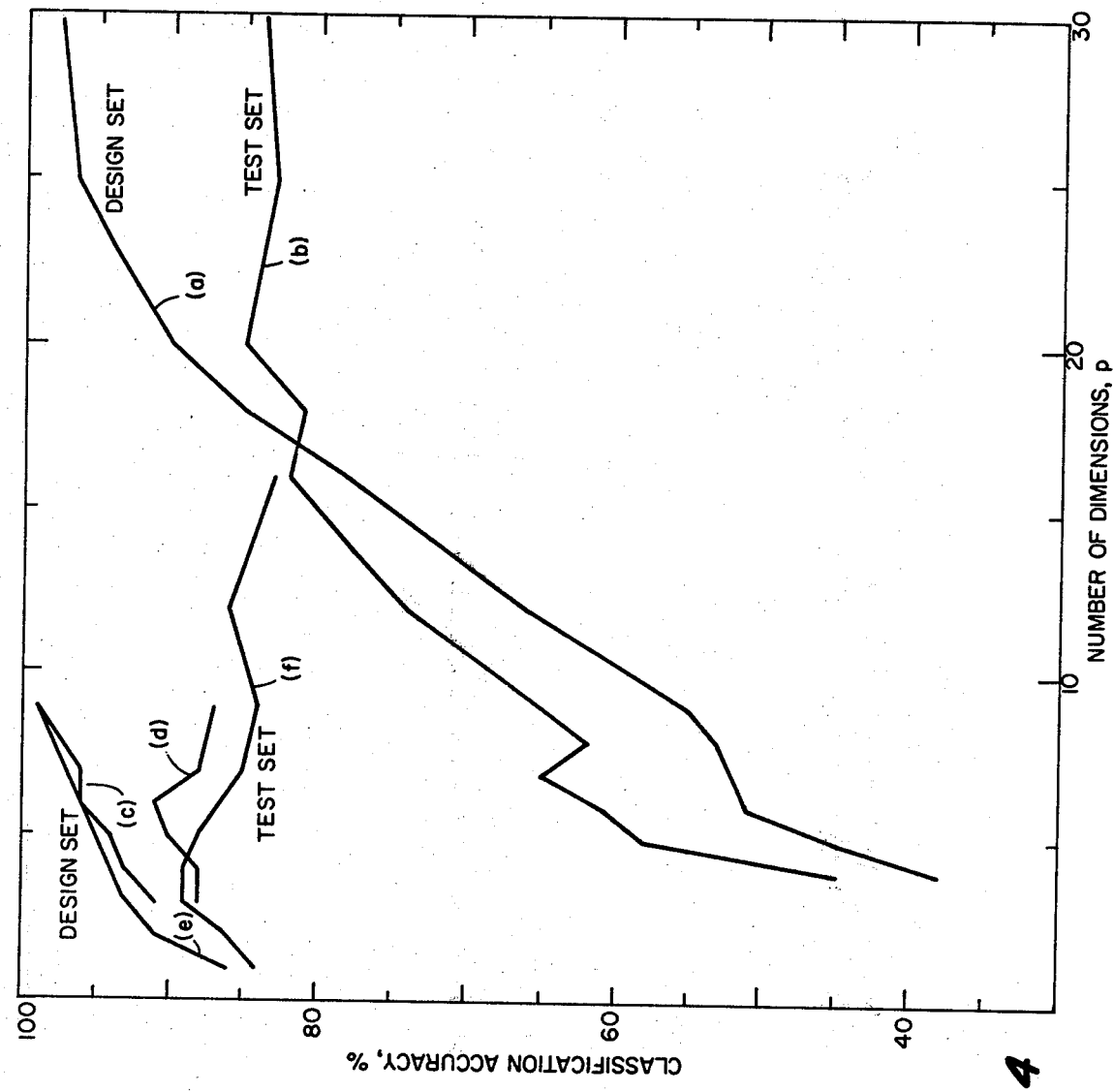
FIG. 4 is a graphic tabulation of classification accuracy using different transformation procedures.

The measured performance of the likelihood statistic L' in the same maximum likelihood decision processor is plotted as graphs (c) and (d) of FIG. 4. It can be seen that as p increases, the classification accuracy again reaches a maximum, but this time at a much smaller number p of dimensions. Moreover the maximum accuracy achieved is noticeably higher than for the statistic L, which differs only by omission of the reconstruction error R.

As a further test of the efficacy of the reconstruction error statistic R, the same practical experiment was again repeated, but this time the likelihood function employed was simply $$L'' = -M. \quad \text{(Equation 8 N)}$$

That is, this time the region in which most of the sample data lie was ignored, while the regions where relatively few samples are found was described. The maximum accuracy obtained (graphs (e) and (f) of FIG. 4) is very nearly as high as for the statistic L', and the maximum occurs at a still smaller number of dimensions p=3. The result can be interpreted to mean that any data sample lying in the space of the first p eigenvectors of K can be accepted as belonging to the target pattern class, and that there is little or no benefit to be gained by making detailed probability estimates within that space.

Statistical Likelihood Calculation

The transformed data $w_i$, corresponding to a formed multi-frame pattern x, are applied as inputs to the statistical likelihood calculation. This processor, as noted above, computes a measure of the probability that the unknown input speech, represented by the successively presented, transformed, multi-frame patterns, matches each of the target patterns of the keyword templates in the machine's vocabulary. Typically, each datum of a target pattern has a slightly skewed probability density, but nevertheless is well approximated statistically by a normal distribution having a mean value $\bar{w}_i$ and a variance $var(w_i)$ where i is the sequential designation of the elements of the $k^{th}$ target pattern. The simplest implementation of the process assumes that the data associated with different values of i and k are uncorrelated so that the joint probability density for the datum x belonging to target pattern k is (logarithmically)

$$L(t/k) = p(x,k) = \sum_i \left[ \tfrac{1}{2} \ln 2\pi(\text{var}(w_i)) - \tfrac{1}{2} \frac{(w_i - \overline{w}_i)^2}{\text{var}(w_i)} \right] \quad \text{(Equation 9)}$$

Since the logarithm is a monotonic function, this statistic is sufficient to determine whether the probability of a match with any one target pattern of a keyword template is greater than or less than the probability of a match with some other vocabulary target pattern, or alternatively whether the probability of a match with a particular pattern exceeds a predetermined minimum level. Each input multi-frame pattern has its statistical likelihood $L(t|k)$ calculated for all of the target patterns of the keyword templates of the vocabulary. The resulting likelihood statistics $L(t|k)$ are interpreted as the relative likelihood of occurrence of the target pattern named k at time t.

As will be well understood by those skilled in the art, the ranking of these likelihood statistics constitutes the speech recognition insofar as it can be performed from a single target pattern. These likelihood statistics can be utilized in various ways in an overall system, depending upon the ultimate function to be performed.

Selection of Candidate Keywords

According to the preferred embodiment of the invention, if the likelihood statistic of a multi-frame pattern with respect to any first target pattern exceeds a predetermined threshold, the comparison being indicated at 101, 103, the incoming data are studied further to determine first a local maximum for the likelihood statistic corresponding to the designated first target pattern, and second, whether other multi-frame patterns exist which correspond to other patterns of the selected potential candidate keywords. This is indicated at 105. Thus, the process of repetitively testing newly formed multi-spectrum frames against all first target patterns is interrupted; and a search begins for a pattern, occurring after the "first" multi-frame pattern, which best corresponds, in a statistical likelihood sense, to the next (second) target pattern of the potential candidate keyword(s).

If a "second" multi-frame pattern corresponding to the second target pattern(s) is not detected within a preset time window, the search sequence terminates, and the recognition process restarts at a time just after the end of the "first" multi-frame pattern which identified a potential candidate keyword. Thus, after the "first" multi-frame pattern produces a likelihood score greater than the required threshold, a timing window is provided within which time a pattern matching the next target pattern in sequence corresponding to the selected potential candidate keyword(s) must appear.

The timing window may be variable, depending for example upon the duration of phonetic segments of the particular potential candidate keyword.

This process continues until either (1) multi-frame patterns are identified in the incoming data for all of the target patterns of a keyword template or (2) a target pattern cannot be associated with any pattern occuring within the allowed time window. If the search is terminated by condition (2), the search for a new "first" spectrum frame begins anew, as noted above, at the spectrum next following the end of the "first" previously identified multi-frame pattern.

At this processing level, the objective is to concatenate possible multi-frame patterns corresponding to target patterns, and to form candidate words. (This is indicated at 107). The detection thresholds are therefore set loosely so that it is very unlikely that a correct multi-frame pattern will be rejected, and here, at this acoustic processing level, discrimination between correct detection and false alarms is obtained primarily by the requirement that a number of the pattern events must be detected jointly.

Post-Decision Processing

Processing at the acoustic level continues in this manner until the incoming audio signals terminate. However, even after a keyword is identified using the likelihood probability test described above, additional post-decision processing tests (indicated at 109) are preferably used to decrease the likelihood of selecting an incorrect keyword (i.e. to reduce the false alarm rate) while maintaining the probability of a correct detection as high as possible. For this reason, the output of the acoustic level processor, that is, a candidate word selected by a concatenation process, is filtered further by a mask of prosodic relative timing windows and/or a likelihood ratio test which uses information from the acoustic level processor concerning all target pattern classes.

The Prosodic Mask

As noted above, during the determination of the likelihood statistics, the time of occurrence of the multi-frame pattern having the local peak value of likelihood statistic relative to the active target pattern is found and in the preferred embodiment is recorded for each of the selected patterns corresponding to the several successive target patterns of a candidate keyword. Those times, $pt_1, pt_2, \ldots, pt_n$ for each candidate keyword are analyzed and evaluated according to a predetermined prosodic mask for that keyword to determine whether the time intervals between successive pattern likelihood peaks meet predetermined criteria. According to the method, the elapsed times between the times of the peak value of likelihood statistic, that is, $pt_i - pt_{i-1}$, for $i = 2, 3, \ldots, n$, are first normalized by dividing each elapsed time interval by: $pt_n - pt_1$. The resulting normalized intervals are compared with a prosodic mask, that is, a sequence of allowable ranges of normalized interval length, for the candidate keyword, and if the interval lengths fall within the selected ranges, the candidate word is accepted.

In the illustrated embodiment the prosodic mask timing windows are determined by measuring the elapsed intervals for sample keywords spoken by as large a number of different speakers as possible. The prosodic pattern is then compared with the statistical sample keyword times using a statistical calculation wherein the mean and standard deviation for each prosodic mask (corresponding to each keyword) are derived from the keyword design set pattern samples. Thereafter, the likelihood statistic is calculated for deciding whether to accept and thus render a final decision with respect to the candidate keyword. This likelihood statistic relates to the timing of events and is not to be confused with the likelihood statistic applied to the multi-frame patterns relative to the target patterns.

In another embodiment of the invention, the ranges of normalize interval duration are loosely set, but are inflexibly fixed. In this embodiment, a candidate keyword is accepted only if the normalized interval times fall within the fixed window boundaries. Thus a candidate word is acceptable only if each of the normalized times fall within the set limits.

Word-Level Likelihood Ratio Test

In the preferred embodiment of the invention, each candidate work is also tested according to a likelihood ratio test before a final decision to accept the keyword is made. The likelihood ratio test consists of summing a figure of merit over that sequence of selected multi-frame patterns which have been identified with the candidate keyword. The accumulated figure of merit, which is the sum of the figures of merit for each multi-frame pattern, is then compared with a decision threshold value.

The figure of merit for a detected multi-frame pattern is the difference between the best log likelihood statistic relative to any target pattern in the keyword vocabulary and the best score relative to those which are permitted choices for the target pattern. Thus, if the best scoring target pattern is a legal alternative for the pattern sought, the figure of merit has the value zero. However, if the best score corresponds to a target pattern not in the list of alternatives for the selected candidate word target pattern (a given target pattern may have several statistical spellings depending upon accents, etc.), then the figure of merit is the difference between the best score and the best among those that did appear in the list of alternates. The decision threshold is optimally placed to obtain the best balance between missed detection and false alarm rates.

Considering the word level likelihood ratio test from a mathematical point of view, the probability that a random multi-frame pattern x occurs, given that the input speech corresponds to target pattern class k, equals p(x|k), read "the probability of x given k." The log likelihood statistic, then, of the input x relative to the $k^{th}$ reference pattern is L(x|k) and equals ln p(x,k) as defined by Equation 9. Assuming that the detected multi-frame pattern must be caused by one of a group of n predefined target pattern classes, and assuming that either the classes occur with equal frequency or the n possible choices are considered to be equally valid, then the probability, in the sense of a relative frequency of occurrence, of observing the event x in any case is the sum of the probability densities defined by the summation:

$$p(x) = \sum_{k=1}^{n} p(x/k) \cdot \frac{1}{n}$$  (Equation 10)

Of these occurrences, the proportion attributable to a given class, p(k|x) equals:

$$p(k/x) = \frac{p(x/k) \cdot \frac{1}{n}}{\sum_{i=1}^{n} p(x/i) \cdot \frac{1}{n}}$$  (Equation 11A)

or logarithmically, $$\ln p(k/x) = L(x/k) - \ln \sum_{i=1}^{n} p(x/i)$$  (Equation 11B)

If the decision processor is then given x, and for some reason chooses class k, then equation 11A or 11B above gives the probability that that choice is correct. The above equations are consequences of Bayes' rule:

$$p(x,k) = p(x|k)p(k) = p(k|x)p(x),$$

wherein p(k) is taken to be the constant 1/n.

If one assumes that only one class, say class m, is very likely, then equation 10 is approximated by $$p(x) \approx \max_{i}\{p(x|i).(1/n)\} = p(x|m).(1/n)$$  (Equation 12)

and we have $$\beta(k,m,x) = L(x|k) - L(x|m) \cong \ln p(k|x)$$  (Equation 13)

Note that if the $k^{th}$ class is the most likely one, then the function $\beta$ assumes its maximum value zero. Summing over the set of presumed independent multi-frame patterns, the accumulated value of $\beta$ estimates the probability that the detected word is not a false alarm. Hence, a decision threshold on the accumulated value of $\beta$ relates directly to the trade-off between detection and false alarm probabilities and is the basis of the likelihood ratio test. The accumulated value of $\beta$ then corresponds to the figure of merit of the candidate keyword.

The realized system using the speech recognition method

As indicated previously, a presently preferred embodiment of the invention was constructed in which the signal and data manipulation, beyond that performed by the preprocessor of FIG. 2, was implemented on and controlled by a Digital Equipment Corporation PDP-11 computer working in combination with a special purpose processor such as that described in copending United States application, Ser. NO. 841,390.

Figure 5B:
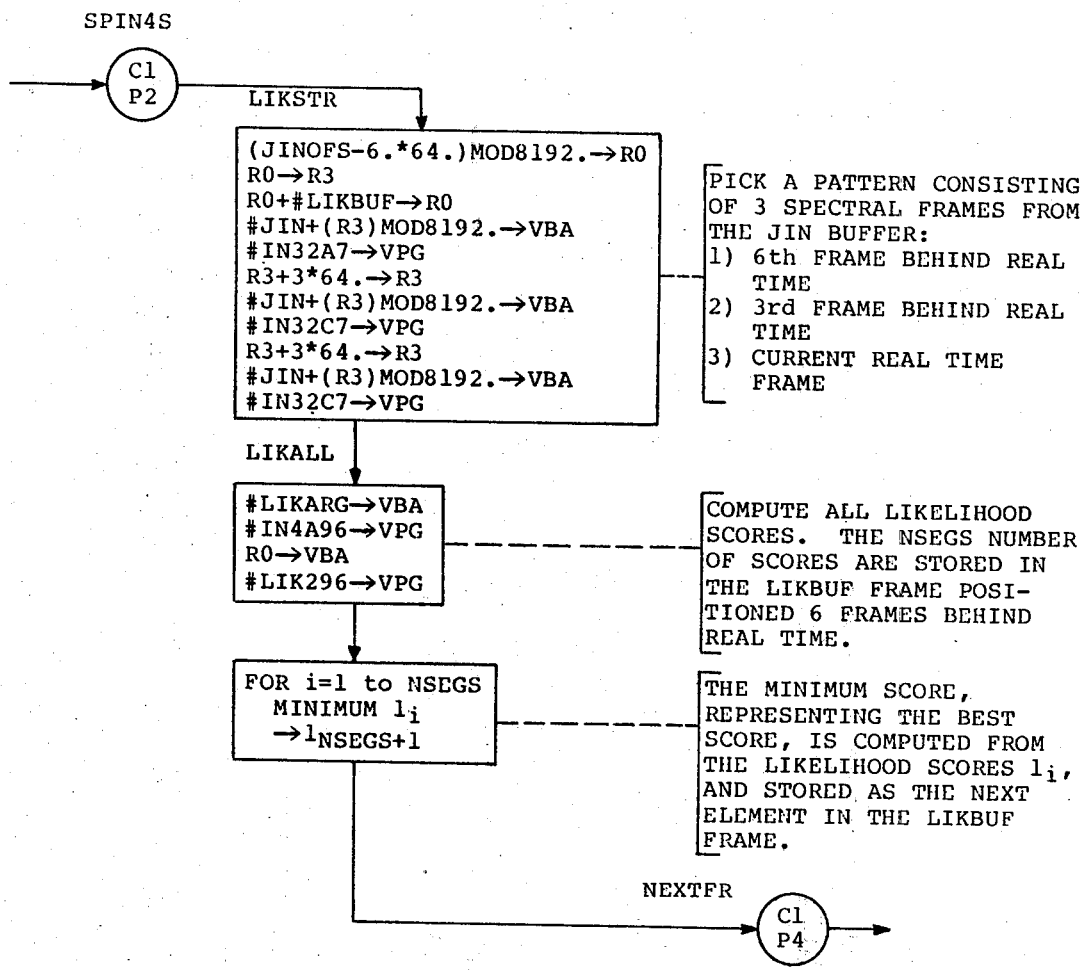
FIGS. 5A–5N, 5P–5AA represent a revised flow chart, with comments, according to a preferred embodiment of the invention.
Figure 5C:
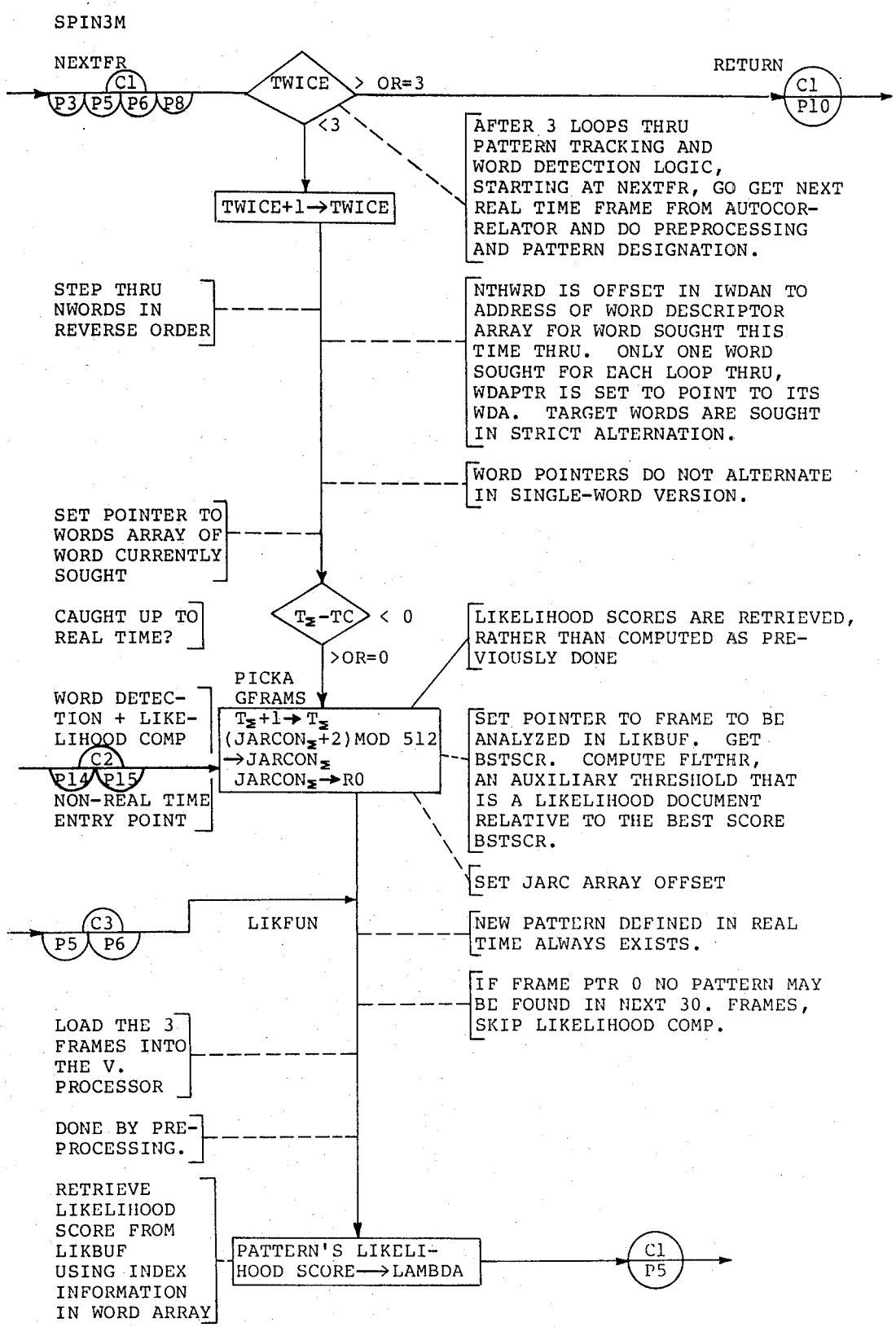
Figure 5D:
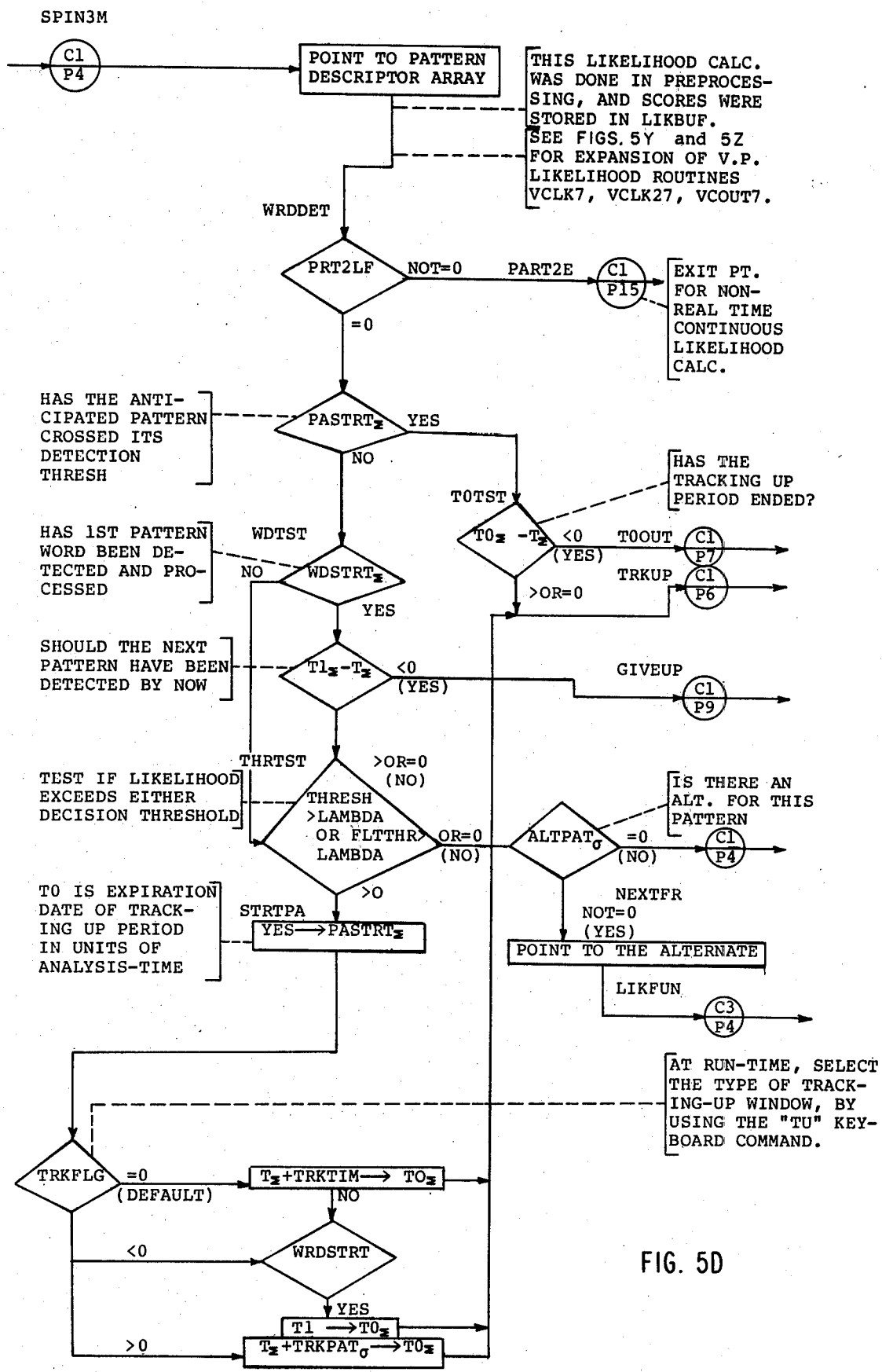
Figure 5E:
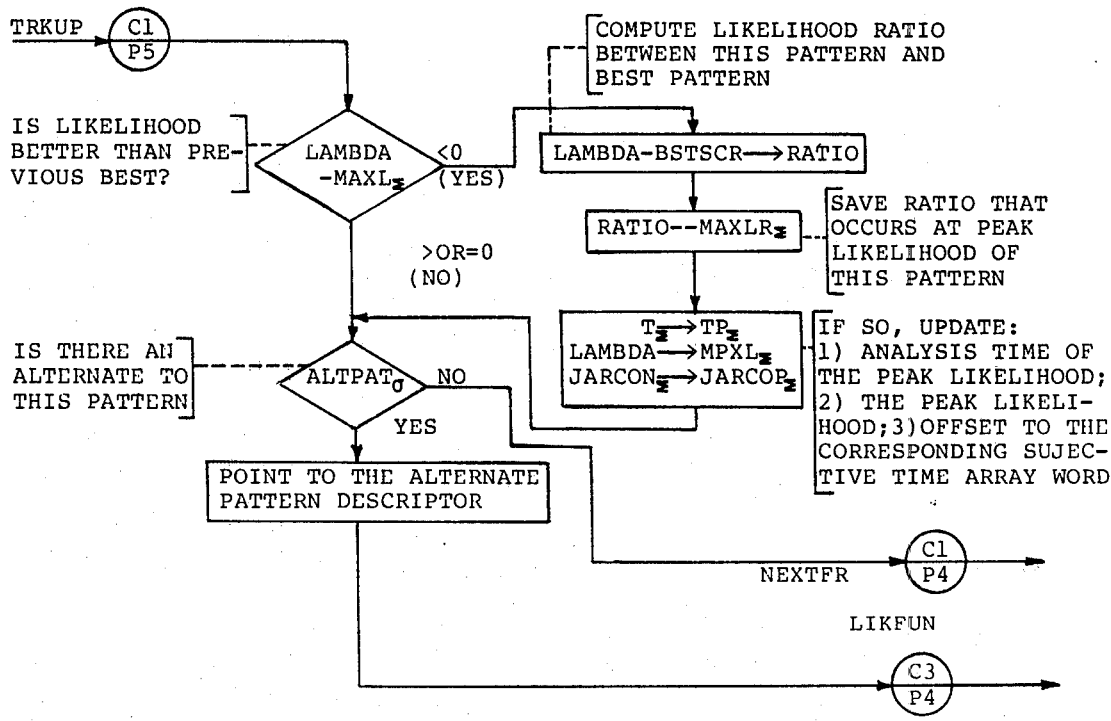
Figure 5F:
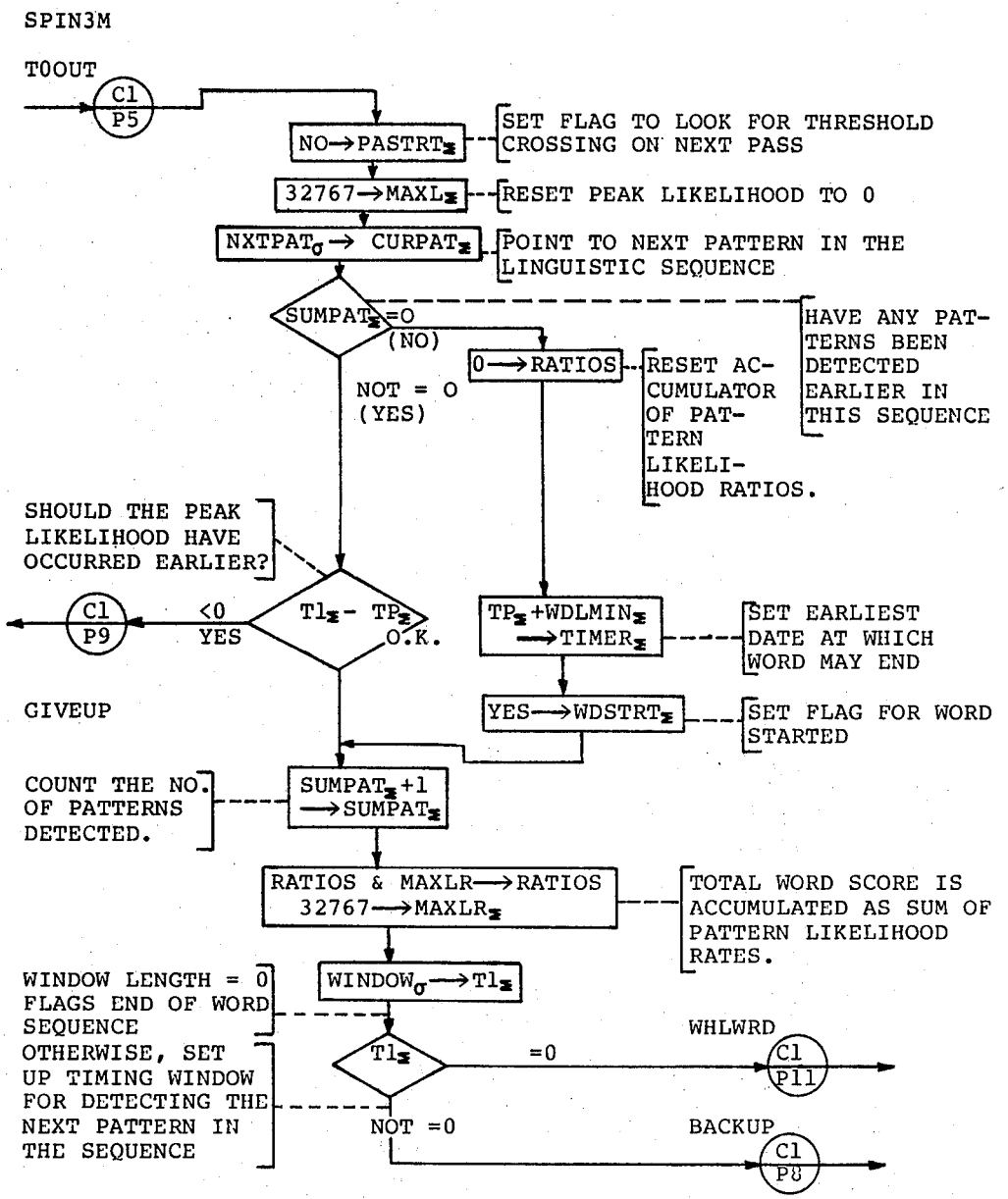
Figure 5G:
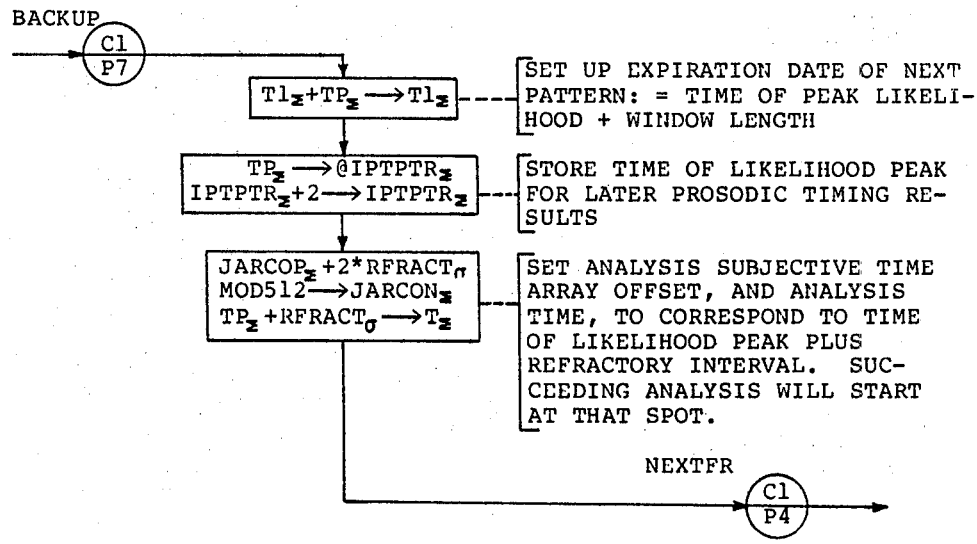
Figure 5H:
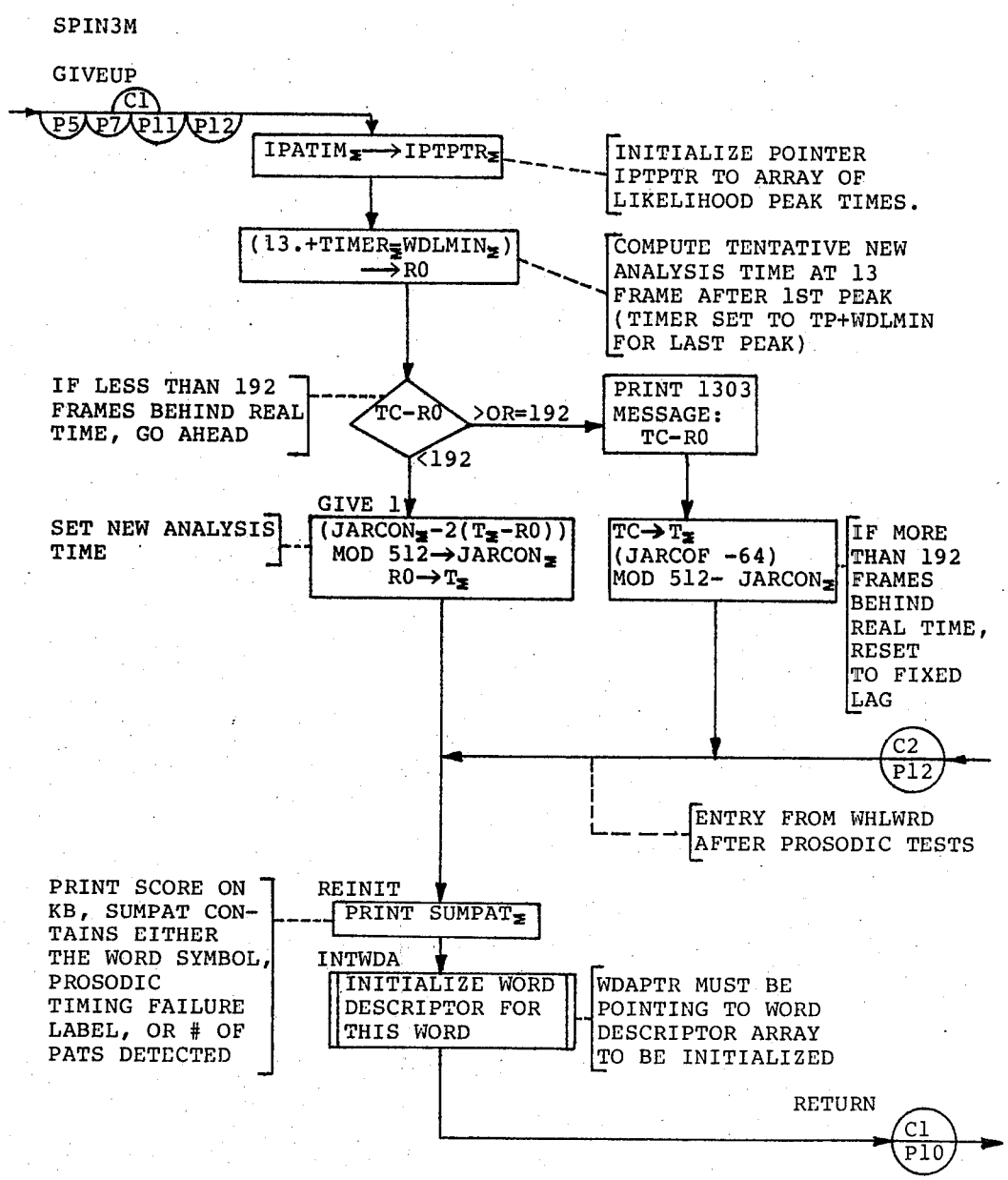
Figure 51:
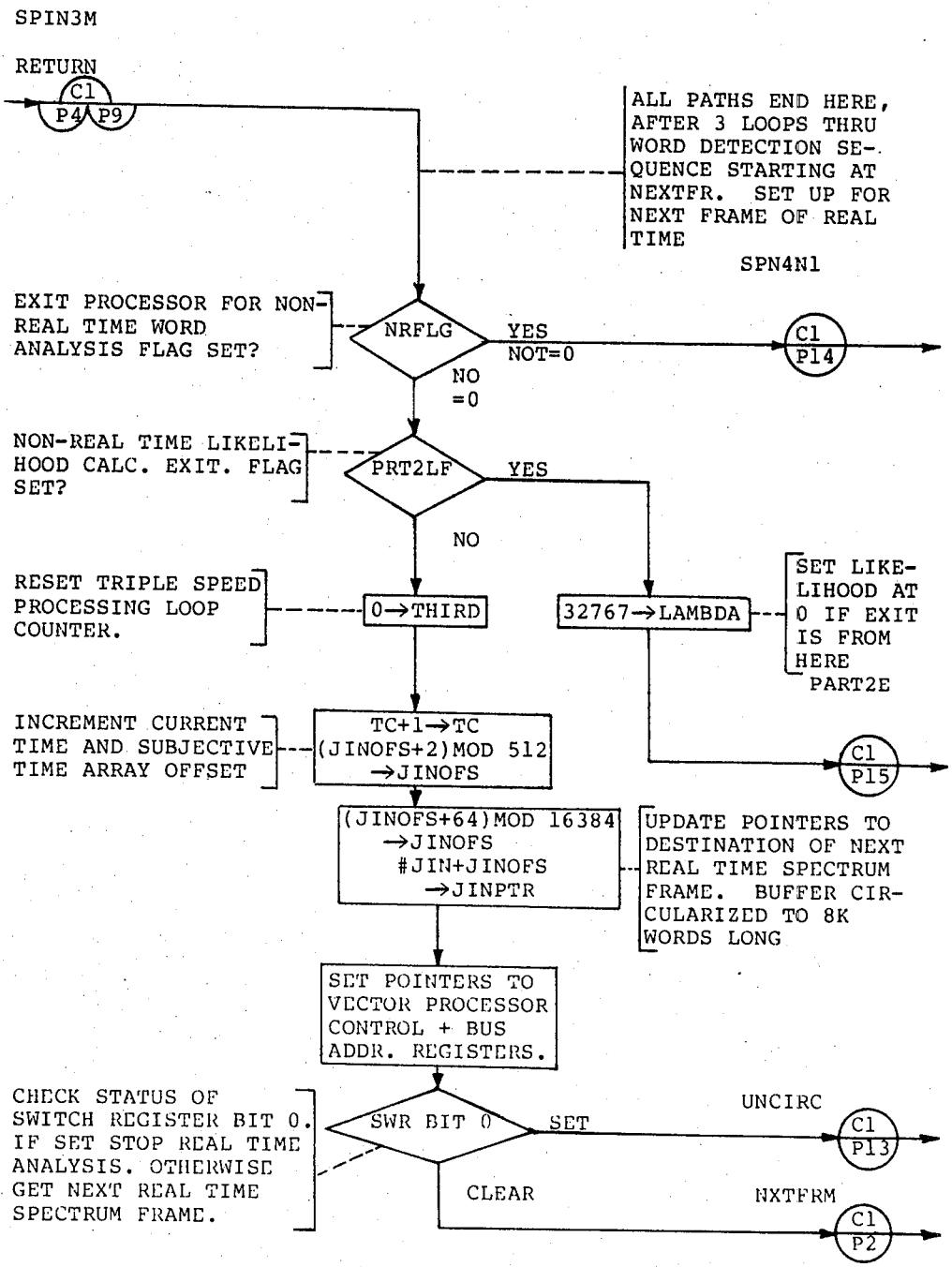
Figure 5J:
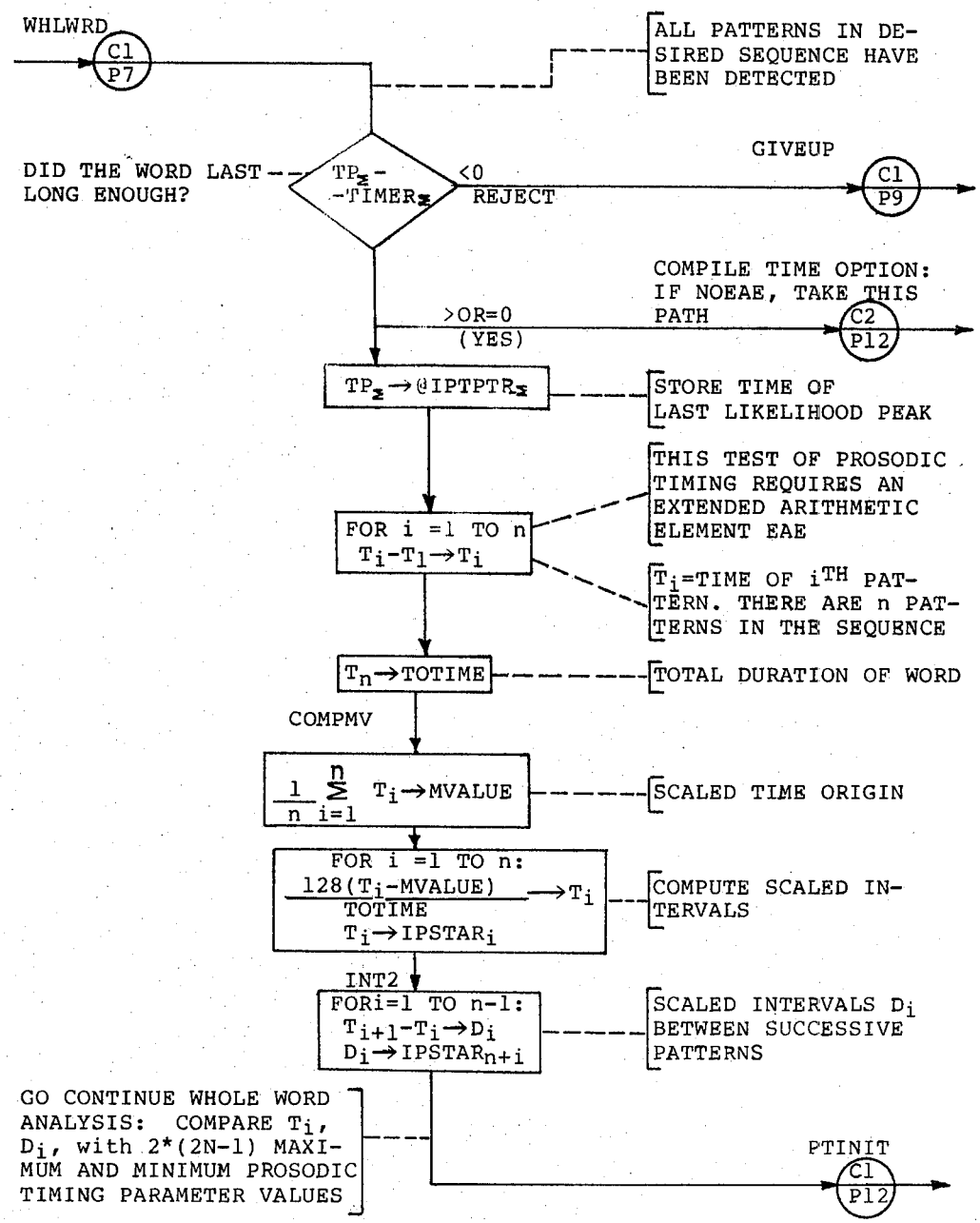
Figure 5K:
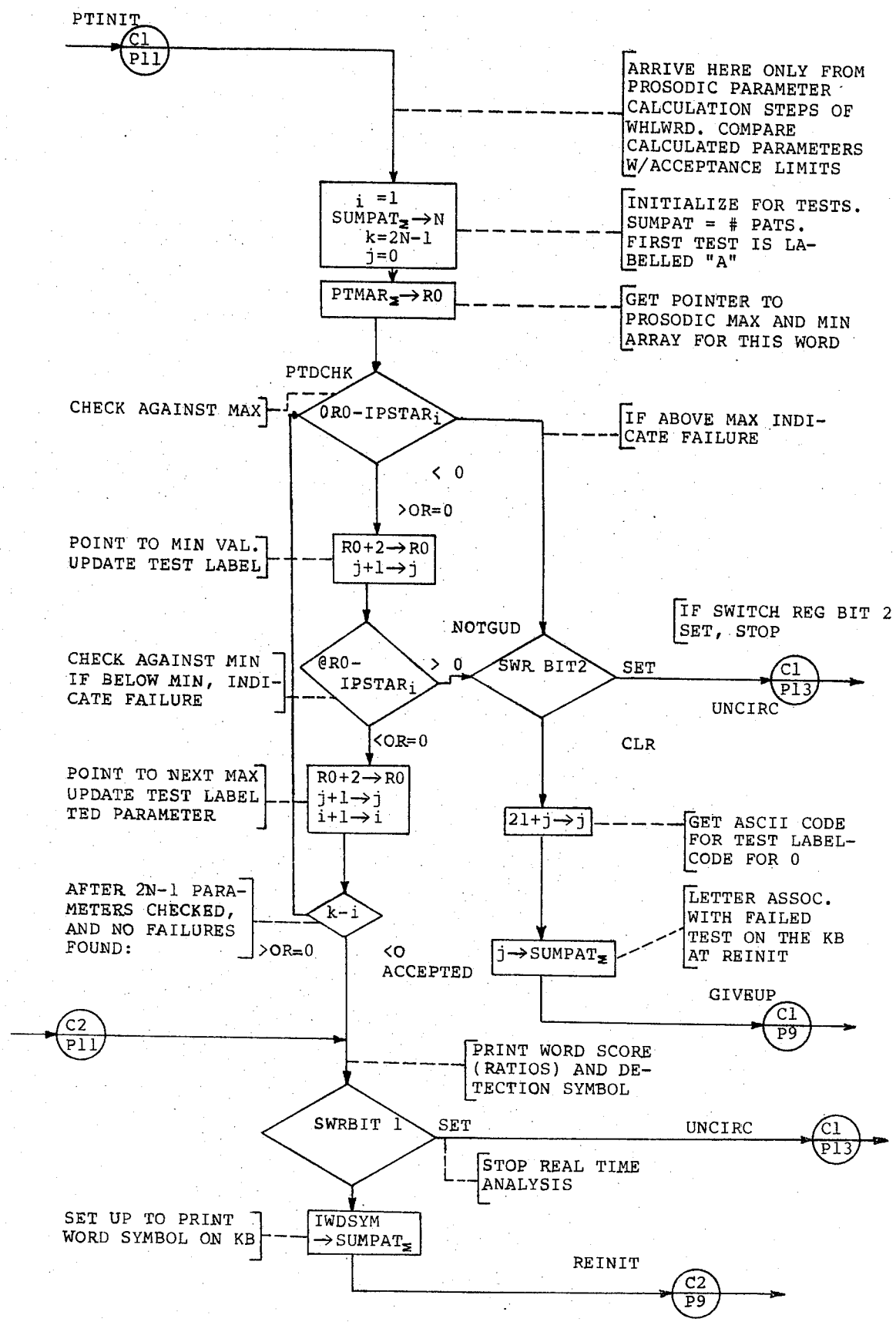
Figure 5L:
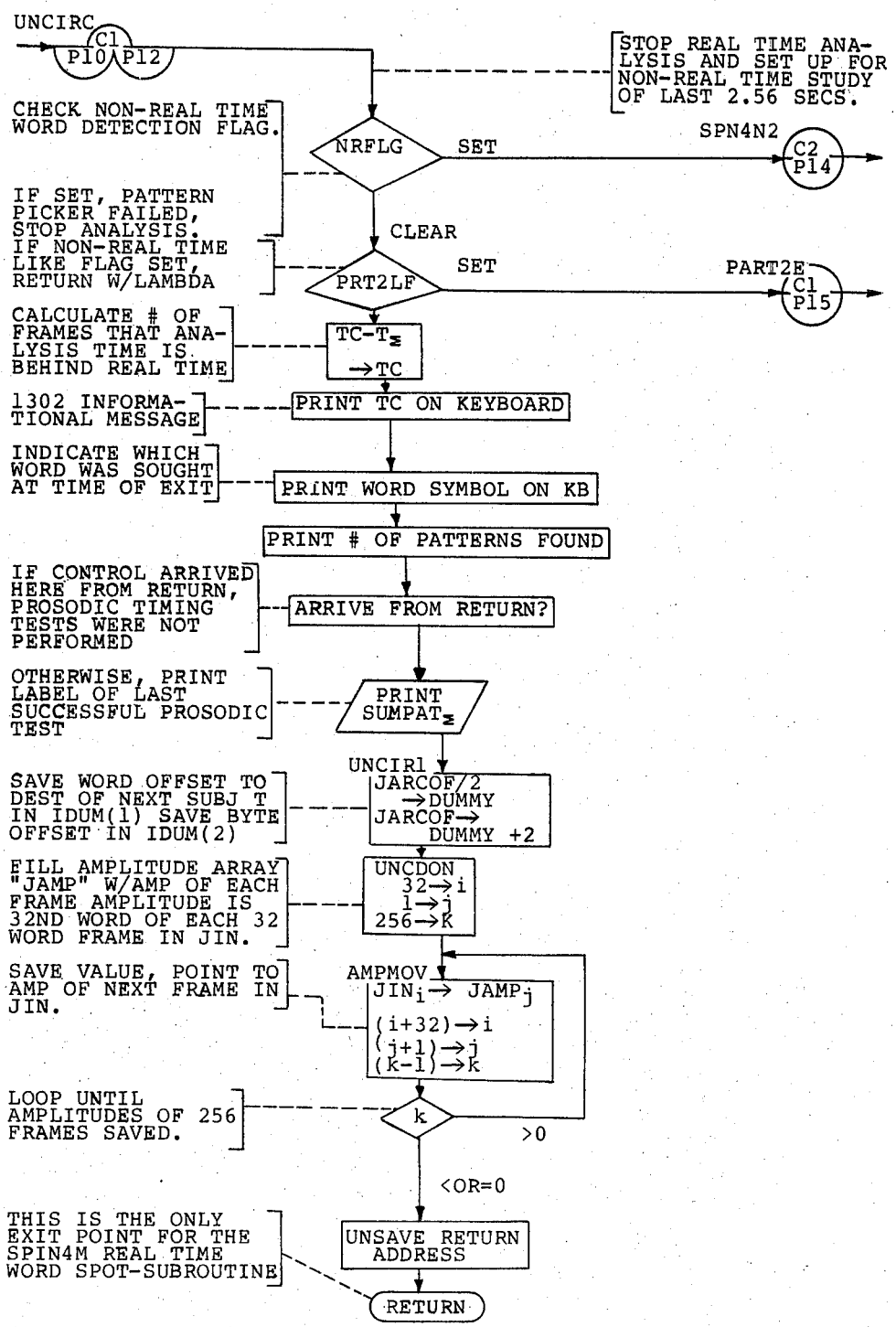
Figure 5M:
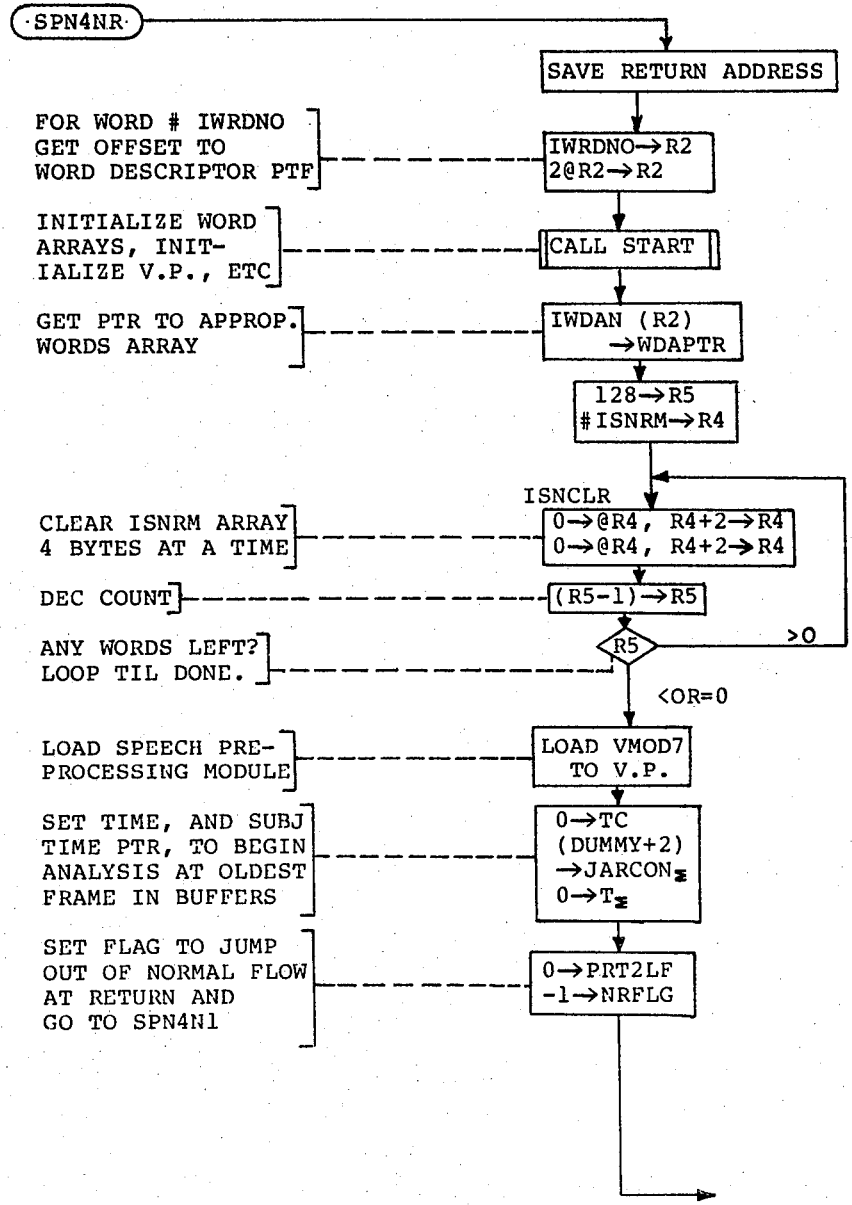
Figure 5N:
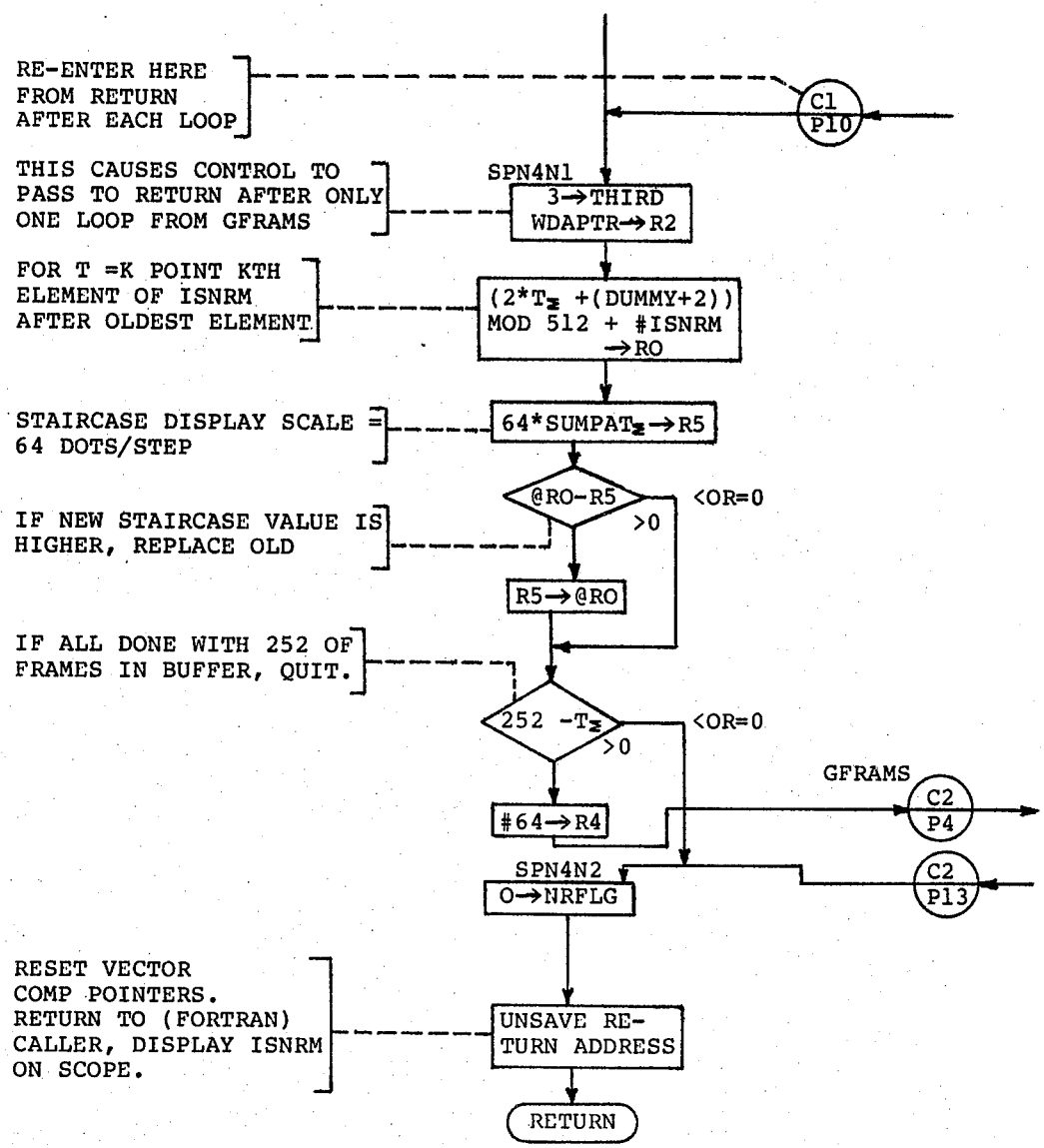
Figure 5P:
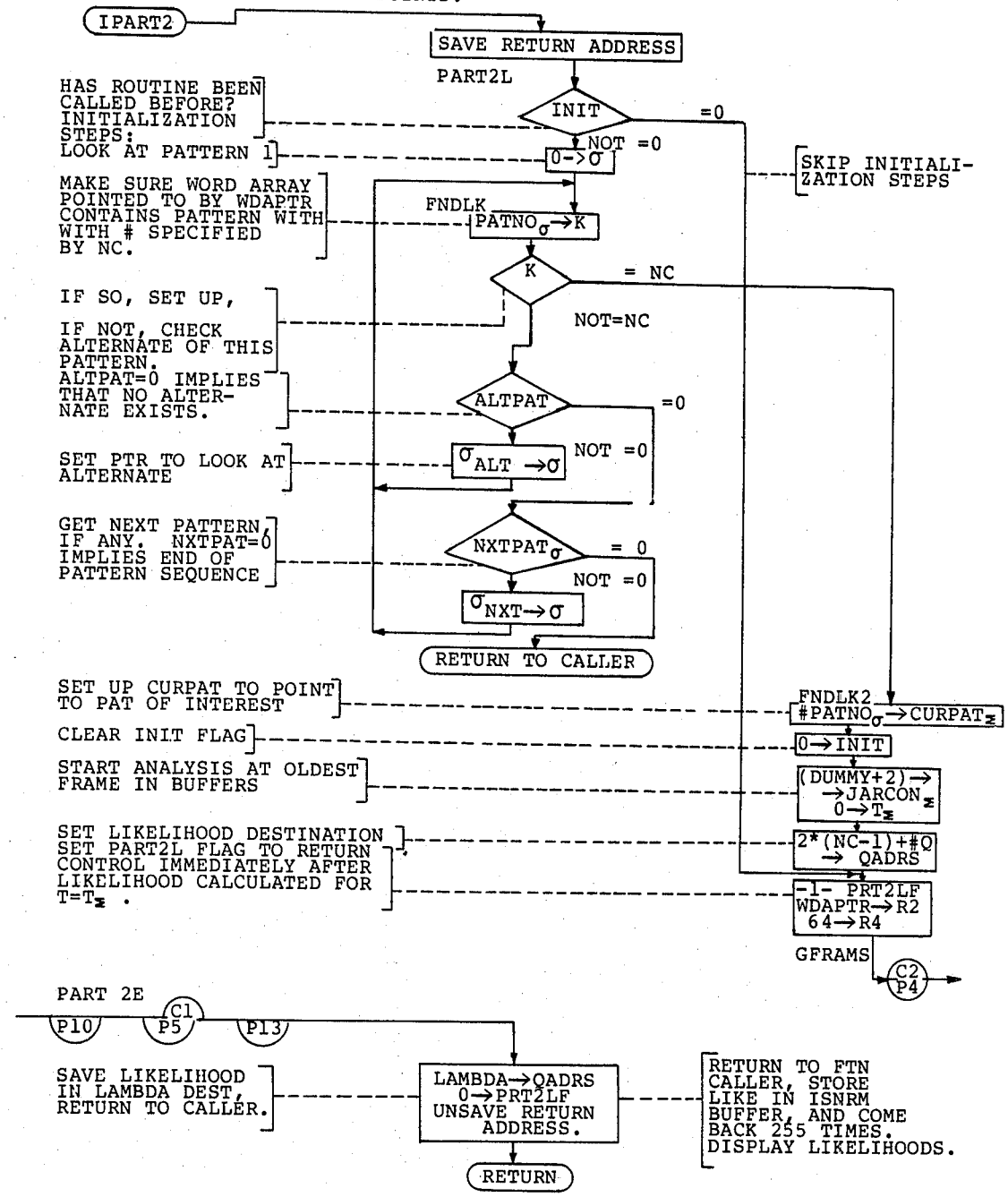
Figure 5Q:
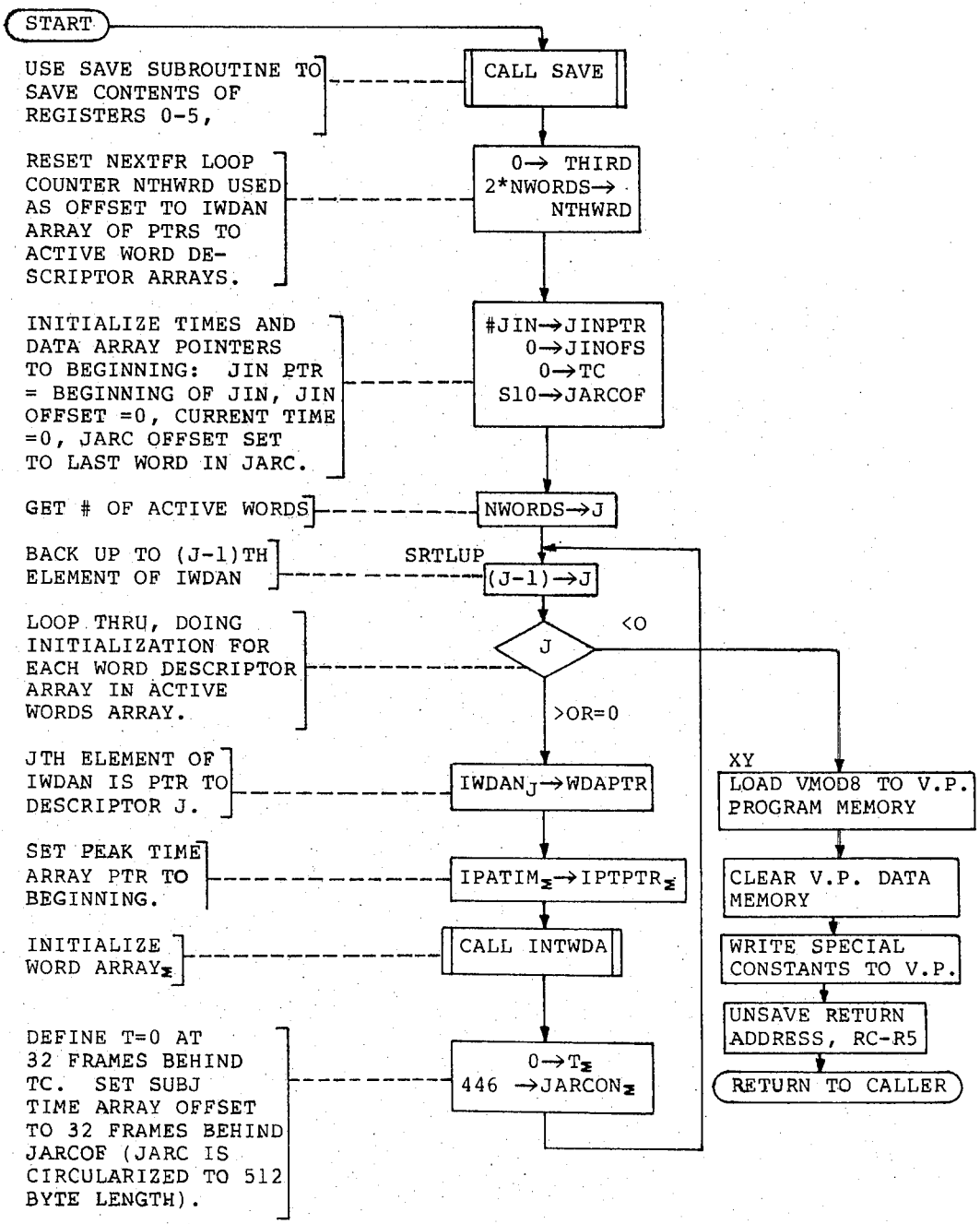
Figure 5R:
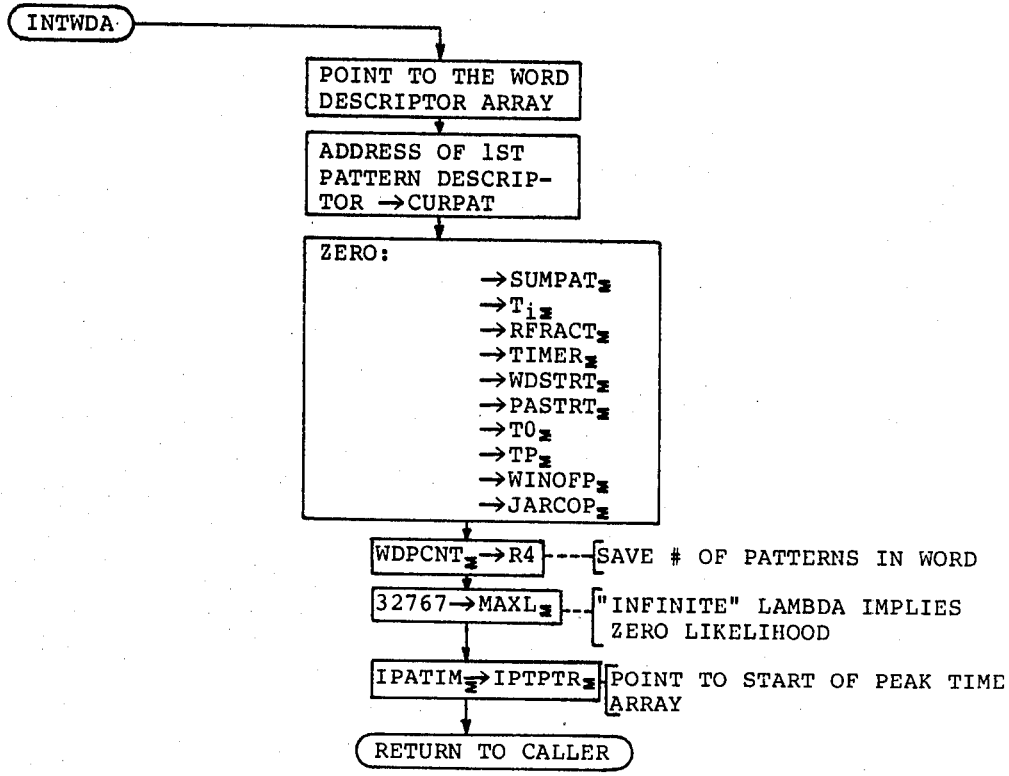
Figure 5T:
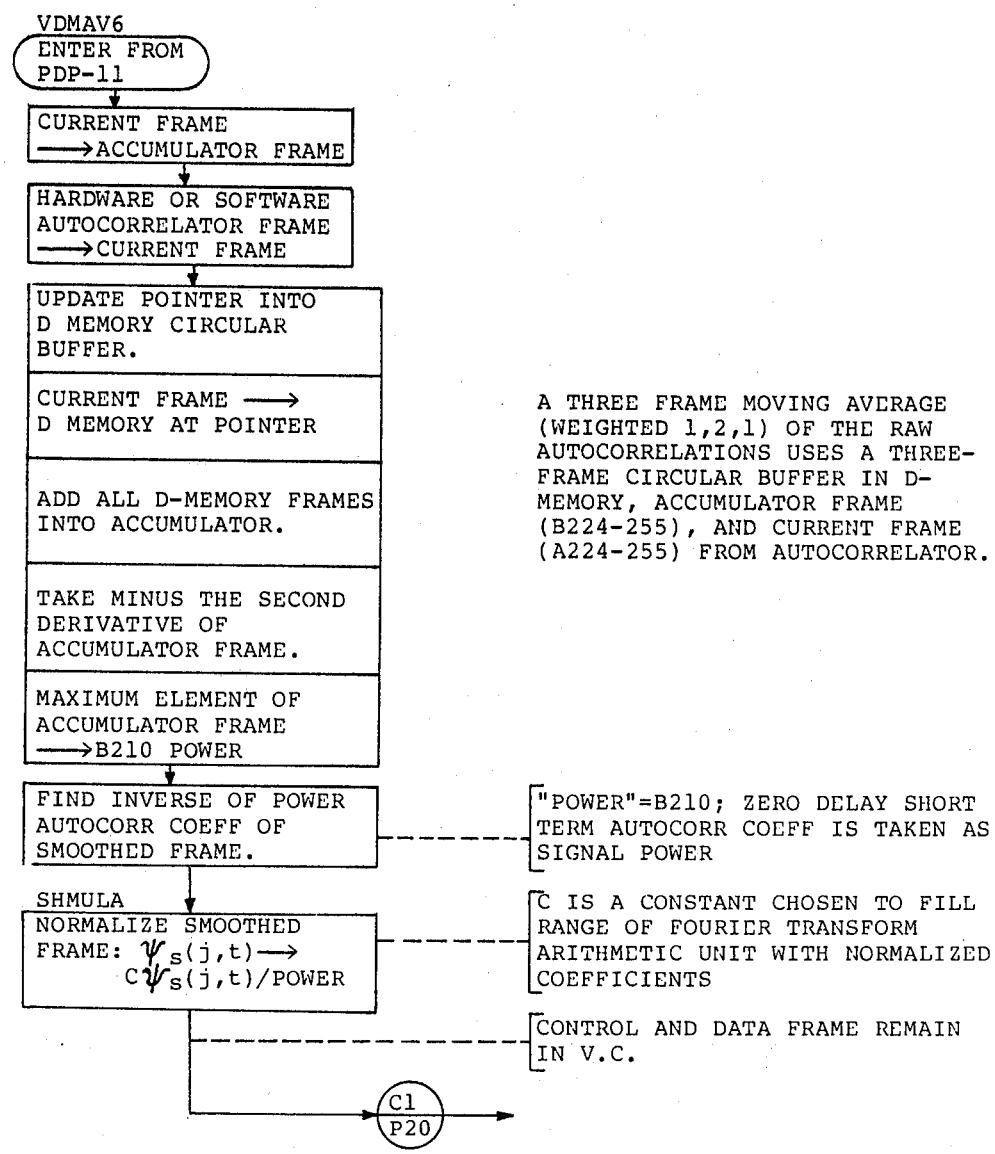
Figure 5U:
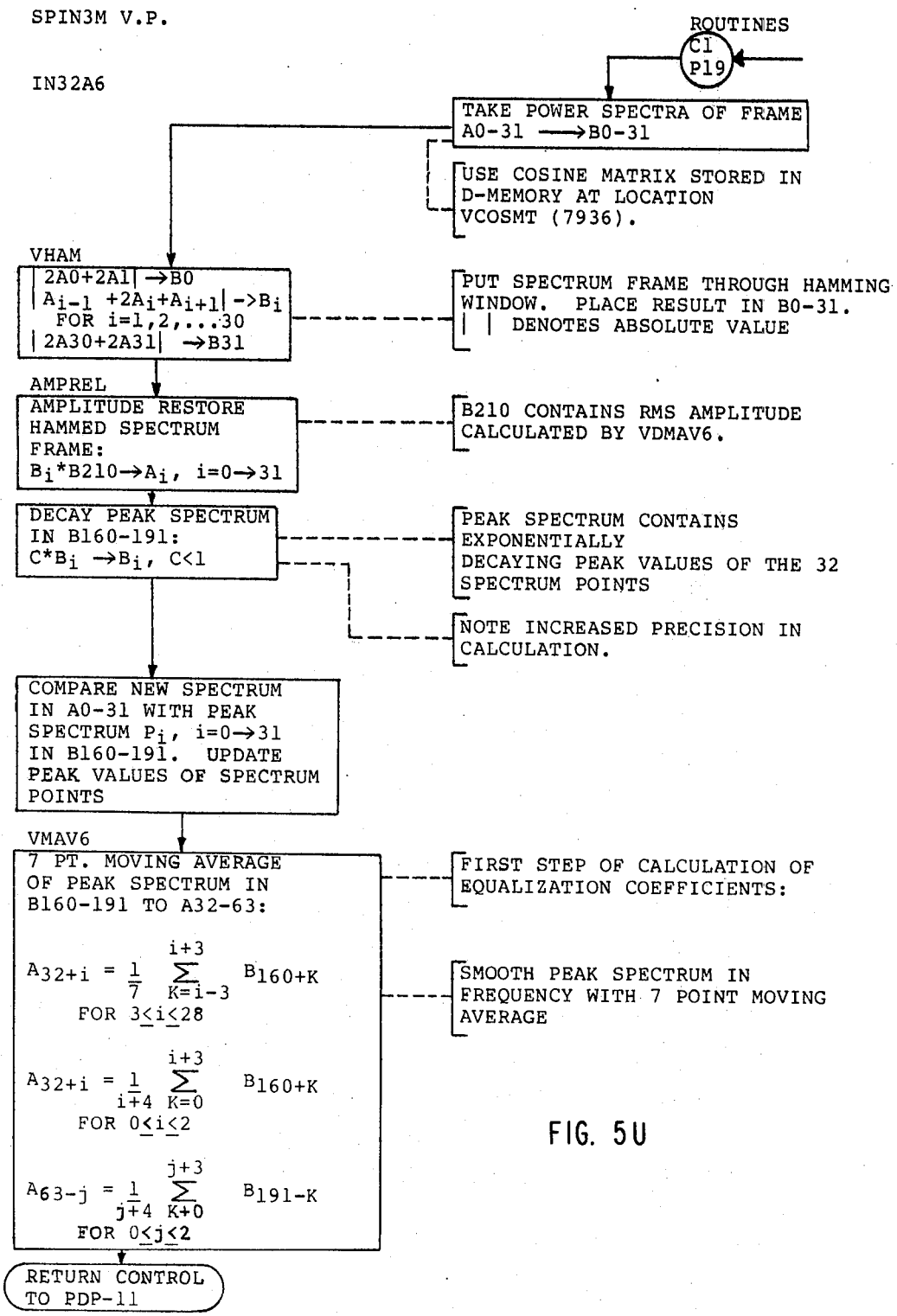
Figure 5W:
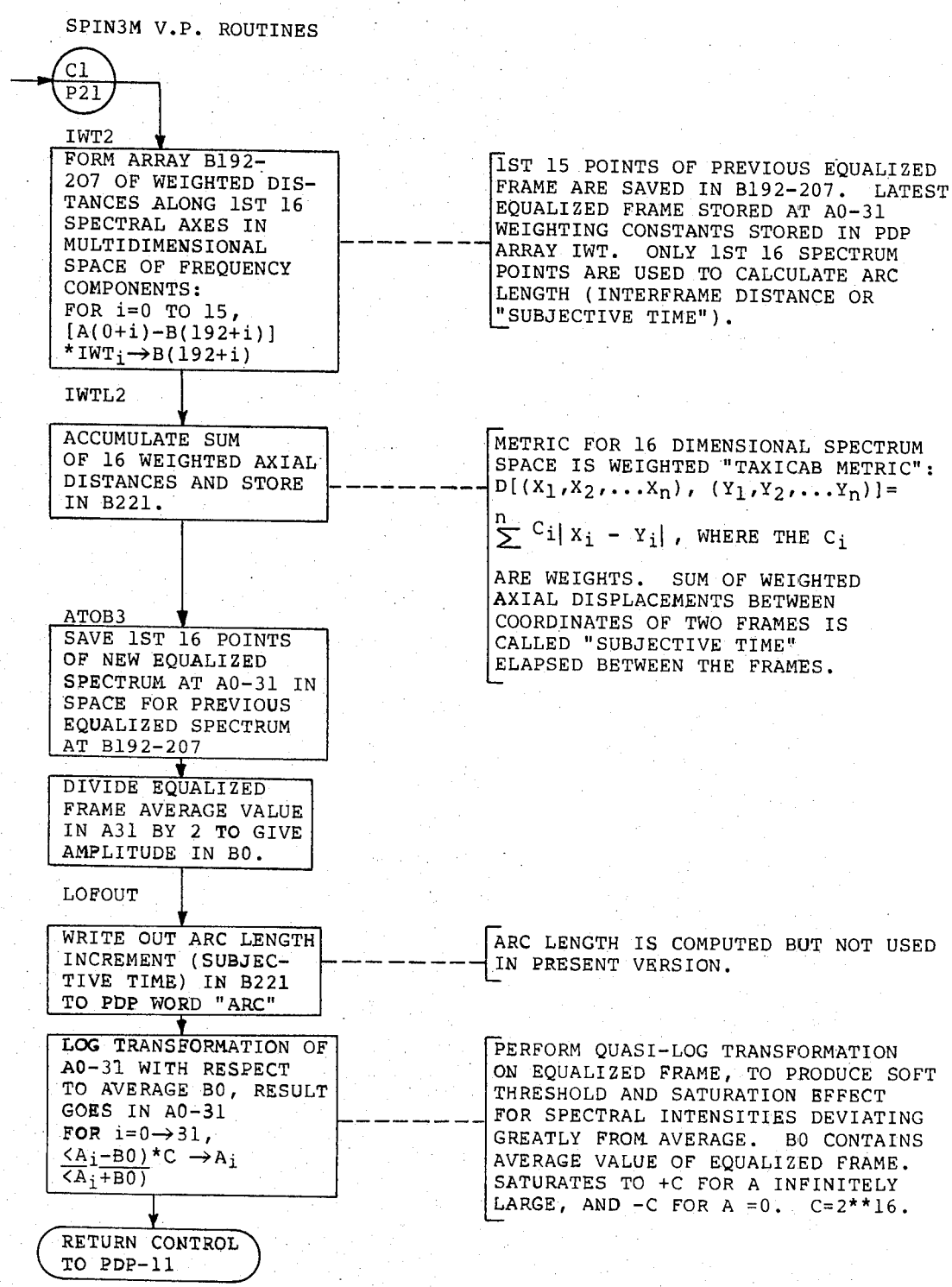
Figure 5X:
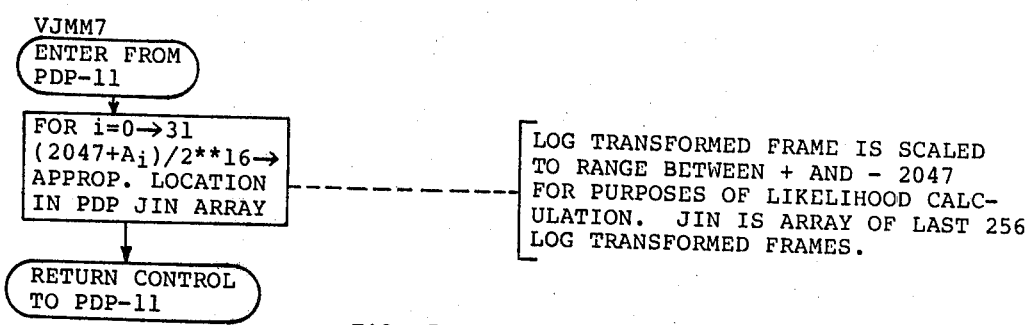
Figure 5Z:
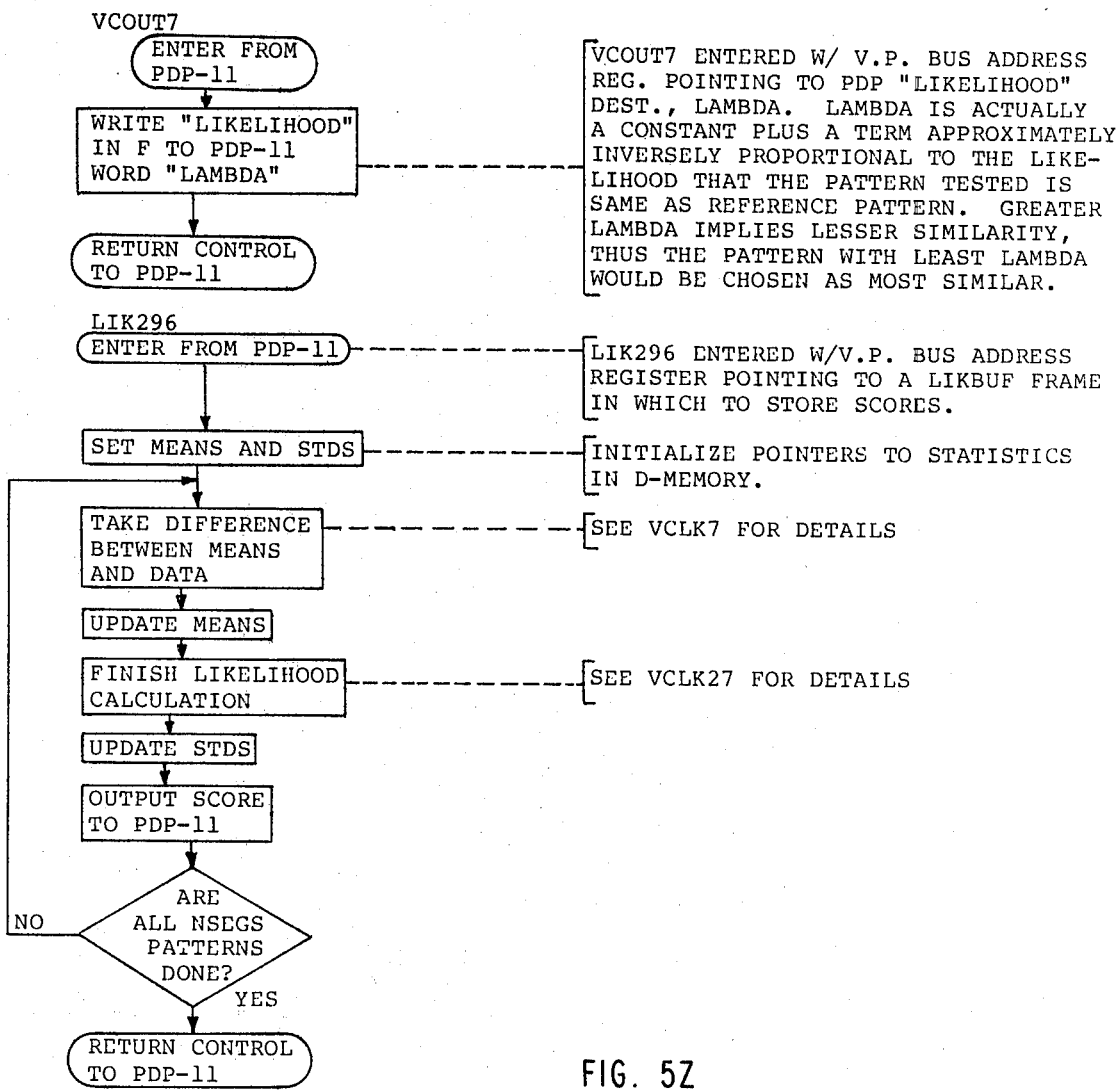
Figure 5A:
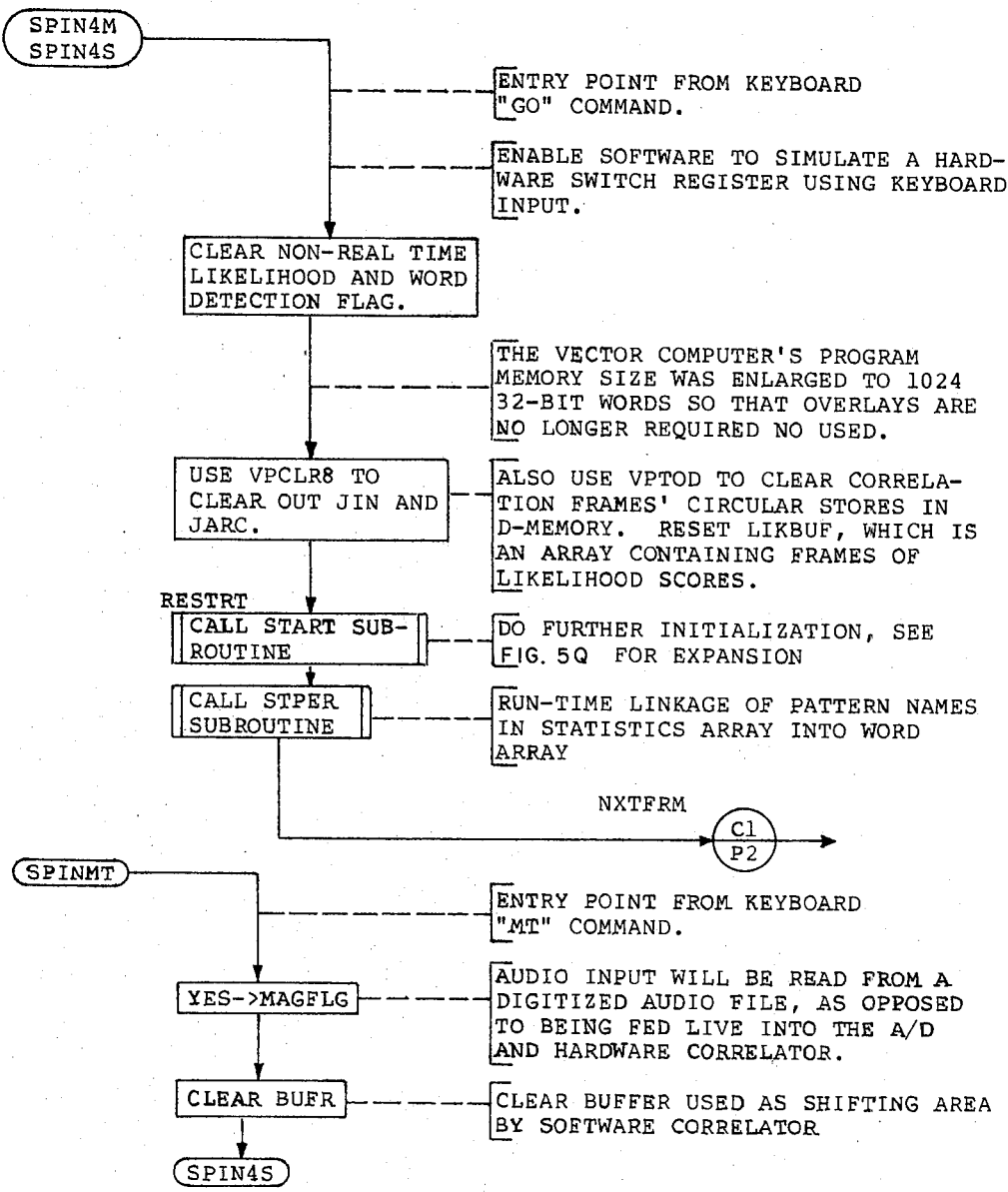

The detailed flow charts which provide the functions described in relation to FIG. 3 are set forth in FIGS. 5A–5AA and are described by comments thereon and the text which follows. These flow charts describe an interactive system demonstration incorporating the speech recognition method of the present invention and providing responses and instruction to the system operator. The interactive program itself forms no part of the present invention and shall not be described in detail herein. However those skilled in the programming art will be able to follow how the interactive program may be employed both to generate design set patterns and to indicate detections of key words.

The correspondance between elements of FIG. 3 and the flow chart of FIGS. 5A–5AA is as follows.

| Figure 3 Block number | Figures 5A-5AA (flow chart) Figure Number | Entry point |
| --- | --- | --- |
| 77,79 | Fig. 5A | NXTFRM |
| 85 | Fig. 5A | FILTER |
| 87 | Fig. 5U | IN32A6 |
| 87,89,91,93 | Fig. 5V | V7GO |
| 95 | Fig. 5X | VJMM7 |
| 97,99 | Fig. 5B | LIKSTR |
| 100 | Fig. 5B | LIKALL |
| 101 | Fig. 5C | NEXTFR |
| 103 | Fig. 5D | PASTRT |
| 105 | Fig. 5C | NEXTFR |
| 107 | Fig. 5F | TOOUT |
| 109 | Fig. 5J | WHLWRD |
| Keywords recognized | Fig. 5K | C2 |

The flowchart Table of Contents (FIGS. 5A–5AA) is as follows:

| Routine Entries | Figure |
| --- | --- |
| SPIN4M | 5AA |
| NEXTFRM | 5A |
| LIKSTR (PICK) | 5B |
| NEXTFR, GFRAMS, LIKFUN | 5C |
| WRDDET | 5D |
| TRKUP | 5E |
| T0OUT | 5F |
| BACKUP | 5G |
| GIVEUP, REINIT | 5H |
| RETURN | 5I |
| WHLWRD | 5J |
| PTINIT | 5K |
| UNCIRC | 5L |
| SPN4NR | 5M |
| SPN4N1, SPN4N2 | 5N |
| IPART2, PART2E | 5P |
| START | 5Q |
| INTWDA | 5R |
| IN32A7, IN32C7 | 5S |
| VDMAV6 | 5T |
| IN32A6 | 5U |
| V7GO | 5V |
| IWT2 | 5W |
| VJMM7 | 5X |
| VCLK7, VCLK27 | 5Y |
| VCOUT7 | 5Z |

The following sections are a description of the software pertinent to an understanding of the Key word spotting algorithm. The program of interest is SPIN3M, SPeech INterpreter 3, Multiple word spotting.

Functions of the Program

The functions of SPIN3M, as controlled by the key board and console are:

1. To accept specification of (up to 2) target words, read in the appropriate reference file of statistical data, and to initialize appropriate tables for the search of words. This function has not been flowcharted, but reference is made to its routine, called "SETPTR".

2. To input continuous speech, and search at a real time rate for occurences of either of the two target words. While doing so, information concerning the status of the algorithm is to be output to the keyboard, and special identifying symbols are to be output upon successful key word detection. The function is performed by the subroutine SPIN4M, whose flowchart is on flowchart FIGS. 5A through 5L and 5AA.

3. To stop Key word search with preservation of algorithm status and all data for the last 2.56 seconds, at the discretion of the operator, upon a successful detection, a false alarm, or at any other time. This is done as part of SPIN4M, with conditional exits at appropriate algorithm points.

4. To search for words on a non-real time basis, in the 2.56 seconds of speech data stored at the time of the real time search halt. The subroutine SPN4NR performs this function, and is flowcharted on FIGS. 5M-5N.

5. To calculate on a non-real time basis, for each 10 ms. interval of the last 2.56 seconds, the likelihood that a given pattern existed. This is done by IPART2, found on flowchart FIG. 5P. Flowchart FIGS. 5Q-5Z document all other routines necessary for functions 2-5, and are referenced as subroutines on FIGS. 5A-5L, 5AA of the flowchart.

LANGUAGE AND GROSS STRUCTURE OF THE PROGRAM

SPIN3M is written in 3 languages, consequently it may be said that there are 3 levels of control during its execution.

The top level is under FORTRAN control, which executes all operations for which time is no consideration. This includes I/O (except PDP-11 to Vector Processor I/O), and the keyboard interactive command interpreter. After accepting commands from the keyboard, the FORTRAN code calls the necessary PAL subroutines. The FORTRAN routines are not flow-charted.

The middle level of control is PAL, or PDP-11 assembly language code. The PAL code is organized as subroutines which are called to execute the real or non-real time word spotting functions. PAL is used to generate most of the pattern concatenation (pattern sequencing) control logic, to control vector processor operations, and generally to direct the word spotting algorithm. PAL routines are described on flowchart FIGS. 5A-5R, 5AA.

Bottom level of control is written the vector processor, as instructed by Vector Computer Assembly language, or VCASM code. The PAL subroutines direct the relinquishing of bus mastership from the PDP-11 to a special high-speed array processor. This array or vector processor performs fast calculations, facilitating execution of preprocessing, time registration, and sound unit (pattern) similarity computation. During the execution of a vector processor routine, the vector processor may read or write to the PDP-11 memory, starting at the address contained in the vector computer bus address register. Following the completion of a vector processor routine, the vector processor halts and control returns to the PDP-11, resuming the execution of PAL code. The vector processor routines are flow-charted as subroutines on flowchart FIGS. 5S-5AA.

PROGRAM DATA STRUCTURES

All PAL and VCASM variables are integers, with a maximum of 16 and 32 bit resolution respectively. All PDP-11 arrays are composed of 16 bit integers. The arrays important to the key word spotting algorithm may be categorized into two types: buffers for input data and arrays of reference and status data.

The contents of the input data buffers may change with every new input frame, and those that accumulate data over a number of frames must be circularized to avoid an attempt to store data beyond their upper boundary. By "circularized", the following is meant. Each time new data is added to the present buffer contents, the buffer pointers are advanced to the destination of the next datum, until they point past the end of the buffer. At this time the destination pointer is reset to the start of the buffer and old data is overwritten by the next input frame. This circular data storing technique implies that real time input data is retained for only a brief interval, during which all processing and decision making must be done. Based on considerations of space limitations and algorithm performance, all input data buffers necessary to real time key word spotting have been circularized to a length corresponding to 2.56 seconds of input data, or 256 input frames.

Every 10 milliseconds a new "frame" is generated by the hardware autocorrelator, and preprocessed by the vector processor. The results of preprocessing are 3 data elements: a spectrum, the frame's subjective time, and the frame's amplitude. The 32 point smoothed, equalized, and log-transformed spectrum is calculated and stored in the frame array JIN, as 32 consecutive 16 bit words. Thus JIN is a circular buffer of spectrum frames, in temporal order, with one frame starting every 64 bytes. The offset to the destination of the next spectrum frame is contained in JINOFS. The circularization of JIN is accomplished by making JINOFS a modulo 16384 offset, that is, modulo 256×64. The frame's subjective time is a 16 bit precision integer, and is stored in 2 bytes of the array JARC. The offset to the destination of the next frame's subjective time is contained in JARCOF, which is made modulo 512=256×2 to circularize JARC to a length of 256 two byte subjective times. The amplitude of the frame is initially output by the vector processor as a 16 bit precision integer in the final word of the 32 word spectrum. In this manner it is used by the likelihood routines as a parameter equivalent in importance to any spectrum point. When real time analysis is halted, all the amplitudes are stored in one buffer, to facilitate non-real time analysis. This buffer is called JAMP, has a length of 512 bytes, and is not circularized since it has no real-time word spotting application.

Every 10 milliseconds, after preprocessing, a new pattern is designated as a combination of three previous input frames. The pattern designated is associated with the frame that was input 31 frames ago. The designation of the pattern associated with a given time involves the specification of pointers to the three frames of the pattern. These pointers are stored in the 3 picked frame buffers FRAM1, FRAM2, and FRAM3. Only the past 256 patterns are valid because data older than 2.56 seconds is lost, thus any pointers to that data which designate a pattern, are meaningless. Since the pointers are 16 bit precision integers, the construction of FRAM1, FRAM2, and FRAM3 is identical to that of JARC, with the offset to the pointer's destination corresponding to a time (see flowchart FIG. 5B). In summary, there are five input data buffers used in real time key word spotting, each updated and circularized to a length of 256 entries every 10 milliseconds. See the table at the end of this section for a summary of input data buffer utilization.

The remaining arrays that are important to real time key word spotting may be categorized as containing either reference or status information. These arrays, once initialized at the beginning of the word spotting run remain either unchanged or are only slightly modified. The arrays in this category are IFILT, IPSTAR, IWDSYM, IWHS, AND IWDAN, and the Word Descriptor Arrays, contained in the module WORDS.

IFILT is the cosine transform matrix used to compute the spectrum of the input data. This array remains constant. IPSTAR is a workspace used by the program when calculating the prosodic timing characteristics of a spotted word.

When key word sotting initialization is executed, the target words are set. Associated with each target is a symbol, a Word Descriptor Array, and mean value and standard deviation statistics. For the Kth target word, the Kth element of IWDSYM is the associated symbol and the Kth element of IWDAN is a pointer to the associated Word Descriptor Array. Thus IWDSWN is an array of target word symbols and IWDAN an array of target word Word Descriptor Array pointers. The mean value and standard deviation statistics for each pattern of all legitimate target words are read into the array IWHS. This also is done at initialization. IWHS remains constant until the operator chooses to introduce a new set of statistics. The SETPTR subroutine assures that statistics for all specified target words may be found in IWHS. It then sets pointers to the statistics for each pattern of Array (WDA). Once this is done a complete definition of each target word may be found in its WDA, and all references to the relevant statistics in IWHS are ade through the pointers in the WDA.

Basic to an understanding of the program strategy is an understanding of the structure of the Word Descriptor Array. After initialization this array contains a complete description of the target word's patterns and timing, and all the necessary information concerning the status of the search for this word (e.g., how may patterns detected so far, etc.). The use of the WDA allows the searches for multiple target words to be independent and asynchronous. All information about algorithm status exterior to the WDAs is target word independent.

The Word Descriptor Array is organized into three sections: first the header, primarily containing information on the history and status of the search, then a series of pattern parameter lists yielding an exact description of all the patterns, their alternatives, and the interpattern timing, and finally two arrays used for the prosodic timing tests which follow the detection of the whole word pattern sequence.

The WDA header is presently 24 words long, but is structured for easy extensibility. Associated with each target is an "analysis time", which indicates how much of the data presently in the input data buffers has been searched. Analysis time is in the same units as what we refer to as "real time", that is, one unit corresponds to one new frame, or 10 milliseconds by the clock. For every new input frame, the current real time is incremented and for every frame in the buffers of past data which is processed and searched, the analysis time is incremented. Each target word has its own analysis time in its WDA, thus the search for one target word may be 50 frames behind current real time, while the search for another is 100 frames behind. Analysis time is of course never ahead of current real time, but is also never allowed to fall far behind current real time, because that would imply analysis of lost data. The target word's header contains the analysis time associated with that target word, called "T", and the corresponding "analysis" subjective time array offset "JARCON". When a pattern is detected, the logic updating the header notes this by incrementing the count of patterns detected, saving the real time of the pattern likelihood peak, saving the likelihood at that peak, and saving offsets to the subjective time and frame of the peak. Various timers are also set to force timing constrains on the detection of the next pattern. The header also is set to point a new pattern parameter list, in section 2 of the WDA, designating it as the current target pattern. See diagram for an exact description of the WDA header.

The WDA pattern parameter lists represent each of the alternative patterns comprising the word pattern sequence. These lists are linked to one another, in that each pattern contains a pointer to its alternative pattern parameter list if one exists, and a pointer to its succeeding pattern parameter list if it is not the final pattern in the word pattern sequence. The pattern parameter list also contains pointers to the statistics for that pattern, and real time timing constraints for the detection of the succeeding pattern.

Following the pattern parameter lists are 2 arrays used for prosodic timing parameter calculation and testing. The first is an array of the maximum and minimum allowable values for each of the $2n-1$ prosodic timing parameters in an n pattern word. The second array is an n word buffer meant to contain the pattern likelihood peak time for each pattern in the word pattern sequence. It is filled during the word spotting routine run. These peak times are used as raw data for the prosodic timing parameter calculation and testing routine described on flowchart FIGS. 5J and 5K.

A detailed depiction of the Word Descriptor Array contents and their ordering follows:

| SPIN4M | (MULTIPLE WORD SEEKING ALGORITHM) |
|---|---|
| WORD DESCRIPTOR ARRAY K (FOR WORD W/SERIAL #K) | |
| SET | WDAPTR = IWDAN(K) "HEADER" INFO: |

| IWDAN(K) | | PTR TO 1ST PATTERN PARAMETER LIST |
|---|---|---|
| 2 (WDAPTR) | | /WORD SPELLED OUT |
| 4 (WDAPTR) | | IN UP TO SIX |
| 6 (WDAPTR) | | ASCII CHARACTERS/ |
| 10 (WDAPTR) = | | CURPAT (WDAPTR) ADDRESS OF PATTERN PARAMETER LIST FOR CURRENT PATTERN SOUGHT |
| 12 (WDAPTR) = | | SUMPAT (WDAPTR) CUMULATIVE # OF PATTERNS DETECTED SO FAR (FOR THIS WORD) |
| 14 (WDAPTR) = | | T1 (WDAPTR) = TP + WINDOW = EXPIRATION TIME OF CURRENT PATTERN SEARCH |
| 16 (WDAPTR) | | UNUSED |
| 20 (WDAPTR) = | | WDPCNT (WDAPTR) # OF PATTERN COMPRISING THE WORD |
| 22 (WDAPTR) = | | TIMER (WDAPTR) = TP1 + WDLMIN = EARLIEST ACCEPTABLE TIME FOR TOTAL WORD END |
| 24 (WDAPTR) = | | WDSTRT (WDAPTR) FLAG SET IF WORD STARTED |
| 26 (WDAPTR) = | | PASTRTT (WDAPTR) FLAG SET IF PATTERN STARTED |
| 30 (WDAPTR) = | | T0 (WDAPTR) = (T OF 1st THRESH CROSSING) + #TRKTIM = EXPIRATION TIME OF PEAK TRACKING FOR THIS PATTERN |
| 32 (WDAPTR) = | | TP (WDAPTR) TIME OF LAST LIKELIHOOD PEAK FOR CURRENT PATTERN |
| 34 (WDAPTR) = | | MAXL (WDAPTR) LIKELIHOOD VALUE OF LAST LIKELIHOOD PEAK FOR CURRENT PATTERN |
| 36 (WDAPTR) = | | UNUSED |
| 40 (WDAPTR) = | | PTMAR (WDAPTR) POINTER TO PROSODIC TIMING MAXIMUM AND MINIMUM ARRAY |
| 42 (WDAPTR) = | | IPTRT (WDAPTR) POINTER TO BE STEPPED THROUGH PEAK TIME ARRAY, INITIALLY = IPATIM |
| 44 (WDAPTR) = | | PATIM (WDAPTR) POINTER TO PEAK TIME ARRAY FOR THIS WORD (FOLLOWS PTMAR) |
| 46 (WDAPTR) = | | T (WDAPTR) ANALYSIS TIME FOR THIS WORD |
| 50 (WDAPTR) = | | JARCON (WDAPTR) POINTER TO CORRESPONDING "ANALYSIS" SUBJECTIVE TIME IN JARC |
| 52 (WDAPTR) = | | UNUSED |
| 54 (WDAPTR) = | | JARCON (WDAPTR) POINTER TO SUBJECTIVE TIME OF LAST LIKELIHOOD PEAK |
| 56 (WDAPTR) = | | WDLIM (WDAPTR) MINIMUM WORD DURATION |

WORD DESCRIPTOR ARRAY: PATTERN PARAMETER LISTS (FOLLOWS "HEADER" INFO)

| PAT1: | | # OF THIS PATTERN |
|---|---|---|
| PAT1+2: | = THRESH (PAT1) | LIKELIHOOD THRESHOLD SETTING FOR THIS PATTERN |
| PAT1+4: | = WINDOW (PAT1) | MAXIMUM DURATION OF SEARCH FOR NEXT PATTERN ( = 0 FOR LAST PATTERN) |
| PAT1+6: | | # OF FRAMES AFTER PEAK OF THIS PATTERN DURING WHICH NEXT PATTERN MAY NOT BE FOUND |
| PAT1+10: | = ALTPAT (PAT1) | ADDRESS OF ALTERNATIVE PATTERN PARAMETER LIST |
| PAT1+12: | = NXTPAT (PAT1) | ADDRESS OF NEXT PATTERN PARAMETER |
| PAT1+14: | = MEANS (PAT1) | POINTER TO MEAN STATISTICS FOR THIS PATTERN |
| PAT1+16: | = STDS (PAT1) | POINTER TO STANDARD DEVIATION STATISTICS FOR THIS PATTERN |
| PAT2: | (SAME AS ABOVE) | |
| | | |
| PATN: | N | NUMBER OF THIS PATTERN |
| | = THRESH (PATN) | |
| | = WDTIME (PATN) | 0 (THIS IS THE LAST PATTERN IN WORD PATTERN SEQUENCE) |
| | | 0 |
| | = ALTPAT (PATN) | 0 |
| | = NXTPAT (PATN) | 0 |
| | = MEANS (PATN) | POINTER TO MEANS FOR THIS PATTERN |
| | = STDS (PATN) | POINTER TO STANDARD DEVIATIONS STATISTICS FOR THIS PATTERN |

WORD DESCRIPTION ARRAY: PROSODIC TIMING MAX AND MIN ARRAY (FOLLOWS PATTERN PARAMETER LISTS)
ASSUME THIS IS THE WDA FOR WORDS WITH SERIAL # =N, WDPCNT = K

| | |
|---|---|
| PTIMN: | MAX FOR SCALED PEAK TIME 1 |
| PTIMN+2: | MIN FOR SCALED PEAK TIME 1 |
| PTIMN+4: | MAX FOR SCALED PEAK TIME 2 |
| PTIMN+6: | MIN FOR SCALED PEAK TIME 2 |
| . | . |
| PTIMN+4 (K-1): | MAX FOR SCALED PEAK TIME K |
| | MIN FOR SCALED PEAK TIME K |
| | MAX FOR SCALED DURATION OF PAT. 1 |
| | MIN FOR SCALED DURATION OF PAT. 1 |
| | MAX FOR SCALED DURATION OF PAT. 2 |
| | MIN FOR SCALED DURATION OF PAT. 2 |
| PTIMN+4 (2K-+0: | MAX FOR SCALED DURATION OF PAT. K-1 |
| | MIN FOR SCALED DURATION OF PAT. K-1 |

WORD DESCRIPTOR ARRAY: PATTERN LIKELIHOOD PEAK TIME ARRAY
(FOLLOWS ABOVE PROSODIC TIMING CONSTRAINTS)

| | |
|---|---|
| PKARN: | TIME OF PEAK 1 |
| | . |
| | TIME OF PEAK K |
| END OF WORD DESCRIPTOR | |

FLOWCHART VARIABLE NAMING CONVENTIONS

Due in part to the fact that SPIN3M is written in 3 languages, the flowchart conventions for variable naming require clarification. Consider the name "X". If X is referenced alone, the variable named has the value of the word at address X. #X is the variable whose value is the address X. Thus #JARC is the address of JARC. @X refers to the variable whose address is contained at address X. This is "indirect" addressing, and according to PAL conventions X must be a register. X(Rn) is the variable whose address is the address X plus the contents of Rn where Rn is register n. All of the preceeding are essentially PAL conventions. X subscripted by an italic character "i" implies that X is the name of an array, and that the variable referenced is the ith element of the array. This is a FORTRAN convention. If X is the character "A" or "B", then An or Bn where n is a positive integer (less than 256) refers to the nth word of the vector computer A or B memory, respectively. A greek subscript to X (usually upper or lower case sigma in the flowcharts) implies that the variable referenced is an element of a Word Descriptor Array or WDA (see dictionary of terms). An upper case sigmna ($\Sigma$) indicates that the variable referenced is part of the header information of the $\Sigma$th WDA. A lower case sigma ($\sigma$) indicates that the variable referenced is an element of the $\sigma$th pattern parameter list of the $\sigma$th Word Descriptor Array. For clarification of WDA structure see data structures sections supra. When it is used in this context X names the element of the array referenced and $\Sigma$ or $\sigma$ denotes the array. Thus the address of the variable CURPAT$_\Sigma$ would be the starting address of the $\Sigma$th WDA plus an offset equal to the predefined value of CURPAT. The address of NXTPAT$_\sigma$ would be the starting address of the $\sigma$th pattern parameter list in the $\nu$th WDA plus an offset equal to the value of NXTPAT. In short, all Greek subscripted names are indices to some part of a Word Descriptor Array, determining which element in the variable referenced. For a summary of variable naming conventions see chart below.

Summary of Flowchart Variable Naming Conventions

| Name | Variable Named |
|---|---|
| X | Variable whose address is X |
| #X | Variable whose value is address X |
| @X | Variable whose address is at address X |
| X(Rn) | Variable whose address is X plus contents of register n |
| X$_i$ | ith element of array X |
| An or Bn | nth word of V.C. A or B memory |
| X$_\Sigma$ | Variable found X bytes after start of $\Sigma$th Word Descriptor Array |
| X$_\sigma$ | Variable found X bytes after start of $\sigma$th pattern parameter list in $\Sigma$th WDA (X has been assigned a numerical value in above 2 cases) |

SUMMARY OF BUFFER UTILIZATION

| Buffer | Use |
|---|---|
| JIN | Stores 32 word spectrum frames (circular) |
| JARC | Stores 1 word subjective times for each JIN frame (circular) (not used) |
| Jamp | Filled with amplitude of each frame in JIN |
| FRAM1 | Pointers to first picked frame of each pattern (no longer used) |
| FRAM2 | Pointers to 2nd picked frame of each pattern (no longer used) |
| FRAM3 | Pointers to 3rd picked frame of each pattern (no longer used) |
| IFILT | Cosine transform matrix |
| IPSTAR | Prosodic timing test workspace (not used) |
| IWDSYM | Array of symbols associated with each target word |
| IWHS | Statistics for all legitimate target words |
| IWDAN | Array of pointers to target word WDAs |
| WDA | A Word Descriptor Array, reference and status information unique to one target word |

OUTPUT

The output from the program is printed on the terminal and has the following form:

1. A stream of digits is printed. Each digit corresponds to the number of pattern detected when the program did a GIVEUP.

2. When all the patterns of a word are found, the word score RATIOS is printed, followed by either "#" or "P". If the word score is less than a fixed threshold, "#" is printed indicating a detection has occurred. Else the word is rejected on the basis of the word score (or possibly the prosodic timing test), and "P" is printed.

OPERATING INSTRUCTIONS

1. Provide audio input using a microphone or recording.
2. Boot the system and write FD to the boot strap.
3. Run the program, read in the file of statistics, and start the detection process.

---
.R KEYWRD
* FS
* STALL
* GO
---

DESCRIPTION OF CHANGES TO KEYWORD SPOTTER—1977 VERSION

1. In the changeover of operating systems from DOS to RT11, the PDP11's assembly language was renamed from "PAL" to "MACRO".
2. The keyboard interactive interpreter was rewritten in MACRO to free core storage by eliminating the FORTRAN environment.
3. The vector computer's program memory size was enlarged to 1024 32 bit words so that run time overlays are no longer required nor used. FIG. 5A.
4. Audio input to the program can be read from a digitized audio file, as opposed to being fed live into the A/D and hardware correlator.
5. Smoothing of raw autocorrelation frames has been reduced to 1/4 1/2 1/4 from 1/5 1/5 1/5 1/5 1/5. FIG. 5T.
6. The pattern has its three frames picked in real-time spacing of 30 ms (3 frames separation), whereas previously variable subjective time spacing was used. FIG. 5B.
7. As part of the preprocessing, all likelihoods scores are computed upon receipt of the real-time input of a speech correlation frame. Then the likelihoods scores are stored in an array LIKBUF, from which they are retrieved asynchronously by the word detection routines. FIGS. 5B, 5C, 5D, 5AA.
8. Experiments with different tracking up windows were tried, but the old method of a fixed length of 180 ms. (10 frames) was found sufficient, besides not requiring measurement of pattern specific values. FIG. 5D.
9. An overall word socre was compiled by summarizing (over all patterns in the word at their likelihood peaks) the likelihood differences between best scores and wanted scores. FIGS. 5E, 5F, 5K.
10. As a compilation option, the prosodic test was deleted from programs to run on a machine without an Extended Arithmetic Element (EAE). FIGS. 5J, 5K.

SPIN3M

SPIN3S is the 1977 version.

This routine is the real time keyword spotter. Written in assembly language, it is called from a keyboard (rewritten in MACRO to reduce its size) interactive interpreter. At time of call to SPIN4M, a table of pointers to target word descriptor arrays (IWDAN) must be set up, pointers to statistics for each pattern must be set in active word descriptor arrays, and NWORDS must be set to # of words to be sought (max of 2 presently). V.C. Program memory has been loaded.

| DICTIONARY OF SYMBOLS & VARIABLES FOUND IN FLOWCHART | |
|---|---|
| # | NUMBER, INDICATES "ADDRESS OF" WHEN PRECEEDING A VARIABLE |
| A | A MEMORY, ONE OF TWO 256 WORD × 32 BIT DATA MEMORIES |
| A0 | 1ST WORD OF VECTOR COMPUTER A MEMORY |
| ADDR | ADDRESS (ABBREVIATION) |
| ALTPAT | PATTERN PARAMETER LIST ELEMENT: PTR TO CURRENT PAT. ALTERNATIVE |
| AMP | DESTINATION OF RMS AMPLITUDE CALCULATED BY V.P. |
| AN | (N + 1)TH WORD OF V.C. A MEMORY |
| ARC | REPOSITORY IN PDP-11 FOR SUBJECTIVE TIME OF CURRENT INPUT FRAME AS CALCULATED BY THE V.P. |
| AUTOCOR | AUTOCORRELATOR (ABBREVIATION) |
| B | B MEMORY, ONE OF TWO 256 WORD × 32 BIT DATA MEMORIES IN THE VECTOR COMPUTER |
| B0 | 1ST WORD OF VECTOR COMPUTER B MEMORY |
| BN | (N + 1)TH WORD OF VECTOR COMPUTER B MEMORY |
| COEFF | COEFFICIENT (ABBREVIATION) |
| COMP. | COMPUTE (ABBREVIATION) |
| CURPAT | WDA ELEMENT: POINTER TO PATTERN PARAMETER LIST FOR CURRENT PATTERN SOUGHT. |
| DUMMY | ARRAY USED FOR PASSAGE OF VARIABLE TO FORTRAN. AT TERMINATION OF REAL TIME SEARCH IT CONTAINS OFFSET TO OLEST JARC TIME |
| F LATCH | VECTOR PROCESSOR STORAGE REGISTER |
| FRAM1 | BUFFER OF POINTERS TO 1ST FRAME PICKED FOR PATTERN CORRESPONDING TO EACH FRAME IN JIN. SAME CONSTRUCTION AS JARC. |
| FRAM2 | BUFFER OF POINTERS TO 2ND FRAME PICKED FOR PATTERN CORRESPONDING TO EACH FRAME IN JIN. SAME CONSTRUCTION AS JARC. |
| FRAM3 | BUFFERS OF POINTERS TO 3RD FRAME PICKED FOR PATTERN CORRESPONDING TO EACH FRAME IN JIN. SAME CONSTRUCTION AS JARC. |
| FRAME | BASIC UNIT OF INPUT DATA: ORIGINALLY 32 AUTOCORRELATION COEFFICIENTS, SUBSEQUENTLY PREPROCESSED INTO A 32 POINT SPECTRUM. ONE FRAME IS A UNIT OF TIME EQUAL TO 10 MILLISECONDS BY THE CLOCK. |

DICTIONARY OF SYMBOLS & VARIABLES FOUND IN FLOWCHART -continued

| | |
|---|---|
| FTN | FORTRAN (ABBREVIATION) |
| 1302 | INFORMATIONAL MESSAGE PRINTED ON KB AFTER TERMINATION OF REAL TIME SEARCH, ACCOMPANIED BY VALUE OF TC-T. |
| 1303 | INFORMATIONAL MESSAGE PRINTED ON KB IF ANALYSIS TIME FALLS TOO FAR BEHIND REAL TIME, ACCOMPANIED BY TC-T. |
| IDT | REAL TIME SEPARATION BETWEEN PICKED FRAMES OF PATTERN. GIVEN IN UNITS OF 10 MS. |
| IFILT | ARRAY OF COSINE TRANSFORM COEFFICIENTS USED TO CALCULATE SPECTRUM OF INPUT FRAME. |
| INIT | INITIALIZATION FLAG SET BY FORTRAN BEFORE CALLING IPART2 AND CLEARED BY IPART2 AFTER INITIALIZATION. |
| INTWDA | SUBROUTINE TO INITIALIZE THE WORD DESCRIPTOR ARRAY CURRENTLY POINTED TO BY WDAPTR |
| IPART2 | NON-REAL TIME LIKELIHOOD CALCULATION SUBROUTINE. CALCS LIKE THAT PATTERN ASSOC. WITH EACH FRAME IS SOUGHT PATTERN. |
| IPATIM | WDA ELEMENT: POINTER TO START OF PEAK TIME ARRAY. |
| IPSTAR | WORKSPACE FOR CALCULATION OF DETECTED WORD'S PROSODIC TIMING PARAMETERS. |
| IPTPTR | WDA ELEMENT: PTR TO DESTINATION OF NEXT PEAK TIME IN PEAK TIME ARRAY (INITIALLY = IPATIM). |
| ISNRM | BUFFER USED BY NON-REAL TIME ROUTINES TO STORE EITHER LIKE OF EACH FRAME (IPART2), or # OF PATS FOUND AT EACH FRAME (SPN4NR). |
| IWDAN | ARRAY OF POINTERS TO TARGET WORD WORD DESCRIPTOR ARRAYS |
| IWDSYM | ARRAY OF SYMBOLS ASSOCIATED WITH EACH TARGET WORD, IN ORDER OF TARGET WORD SPECIFICATION. |
| INT | ARRAY OF SUBJECTIVE TIME WEIGHTS. SUBJ TIME IS BASED OF THE SUM OF WEIGHTED SPECTRAL CHANGES |
| JAMP | ARRAY OF APLITUDES OF EACH FRAME IN JIN. FILLED ONLY AFTER TERMINATION OF REAL TIME SEARCH |
| JARC | 256 WORD ARRAY OF 16 BIT FRAME SUBJECTIVE TIMES (CIRCULAR) |
| JARCEN | LAST WORD OR END OF JARC. |
| JARCOF | OFFSET TO JARC INDICATING DESTINATION OF NEXT INPUT FRAME'S SUBJECTIVE TIME. |
| JARCON | WDA ELEMENT: JARC OFFSET TO SUBJ. TIME CORRESPONDING TO PEAK LIKELIHOOD. |
| JIN | 8K WORDS ARRAY OF 256 32 WORD SPECTRUM FRAMES (CIRCULAR) |
| JINOFS | BYTE OFFSET TO JIN GIVING DESTINATION OF NEXT 32 POINT SPECTRUM FRAME. |
| JINPTR | POINTER TO DESTINATION OF NEXT INPUT SPECTRUM FRAME IN JIN. JINPTR = #JIN + JINOFS |
| KB | KEYBOARD (ABBREVIATION) |
| LABDA | PATTERN SIMILARITY MEASURE (APPROX. INVERSELY PROPORTIONAL TO LIKE. THAT TEST PATTERN IS SAME AS THE REFERENCE PATTERN). |
| LC | ALPHABETIC ARGUMENT OF KEYBOARD COMMAND. |
| LIKE | LIKELIHOOD (ABBREVIATION) |
| MAXL | WDA ELEMENT: PEAK LIKELIHOOD FOUND FOR CURPAT SO FAR |
| MEANS | PATTERN PARAMETER LIST ELEMENT: POINTER TO START OF MEAN VALUE STATISTICS FOR THIS PATTERN |
| MOD | MODULO: X MODULO N = REMAINDER OF X/N |
| MVALUE | MEAN VALUE OF DETECTED WORD'S PATTERN PEAK TIMES |
| NC | NUMERICAL ARGUMENT OF KEYBOARD COMMAND |
| NRFLG | NON-REAL TIME WORD DETECTION FLAG, SET IF SPN4NR EXECUTING |
| NTHWRD | BYTE OFFSET IN IWDAN TO PTR POINTING TO WORDS ARRAY OF WORD CURRENTLY SOUGHT. BYTE OFFSET TO SYMBOL IN IWDSYM. |
| NWORDS | NUMBER OF WORDS TO BE SOUGHT (AT PRESENT A MAXIMUM OF 2). |
| NXTPAT | PATTERN PARAMETER LIST ELEMENT: PTR TO PAT. SUCCEEDING CURPAT. |
| PAL | PDP-11 ASSEMBLY LANGUAGE. |
| PASTRT | WDA ELEMENT: FLAG SET IF CURRENT PATTERN SOUGHT HAS CROSSED LIKELIHOOD THRESHOLD AND IS BEING TRACKED FOR PEAK. |
| PATTERN | BASIC SOUND UNIT, COMPOSED OF THREE SPECTRAL FRAMES EQUALLY SPACED IN SUBJECTIVE TIME. |
| PC | PROGRAM COUNTER, I.E., R7 FOR PDP-11 |
| PDP | PROGRAM DATA PROCESSOR-DEC MACHINE |
| PK | PEAK (ABBREVIATION) |
| POINTER | A POINTER TO X IS A WORD CONTAINING THE ADDRESS OF X |
| PRT2LF | FLAG SET (NOT = 0) IF NON-REAL TIME LIKELIHOOD ROUTINE RUNNING. |
| PTMAR | WDA ELEMENT: POINTER TO ARRAY OF PROSODIC TIMING PARAMETER |
| PTR | POINTER (ABBREVIATION) |
| QADRS | DESTINATION OF LIKELIHOOD CALCULATED BY IPART2 FOR |

-continued

| | DICTIONARY OF SYMBOLS & VARIABLES FOUND IN FLOWCHART |
|---|---|
| | EACH FRAME, USED TO PASS LIKE TO FORTRAN |
| R0 | REGISTER 0 |
| R1 | REGISTER 1 |
| R2 | REGISTER 2 |
| R3 | REGISTER 3 |
| R4 | REGISTER 4 |
| R5 | REGISTER 5 |
| R6 | REGISTER 6 |
| R7 | REGISTER 7 |
| SAVE | SUBROUTINE TO SAVE CONTENTS OF REGISTERS 0 THRU 5. |
| SETPTR | SUBROUTINE CALLED BY FORTRAN TO SET TARGET WORDS AND SET POINTERS TO THEIR STATISTICS IN THEIR WORD DESCRIPTOR ARRAYS. |
| SP | STACK POINTER, I.E., R6 FOR PDP-11 |
| SPIN3M | SPEECH INTERPRETER 3, MULTIPLE WORD SPOTTING (ENTIRE PROGRAM). |
| SPIN4M | SPEECH INTERPRETER 4, MULTIPLE WORD SPOTTING, REAL TIME PAL SUBROUTINE |
| SPN4NR | NON-REAL TIME WORD SPOTTING SUBROUTINE. SEEKS ONE TARGET WORD IN DATA SAVED IN BUFFERS FROM REAL TIME RUN. |
| START | BUFFER INITIALIZATION SUBROUTINE (DOES NOT CHANGE TARGET WORDS). |
| STDS | PATTERN PARAMETER LIST ELEMENT: POINTER TO START OF STANDARD DEVIATION STATISTICS FOR THIS PATTERN |
| SUBJ | SUBJECTIVE (ABBREVIATION) |
| SUMPAT | WDA ELEMENT: NUMBER OF PATTERNS IN WORD PATTERN SEQUENCE DETECTED SO FAR |
| SWR | CONSOLE SWITCH REGISTER |
| T | WDA ELEMENT: ANALYSIS TIME. TIME (IN REAL TIME UNITS OF FRAME ACTUALLY BEING ANALYZED. TC-256 < T < TC |
| T0 | WDA ELEMENT, EXPIRATION TIME OF PEAK TRACKING FOR THIS PATTERN. T0 = TP OF FIRST THRESH CROSSING) + TRKTIM |
| T1 | WDP ELEMENT: TP + WINDOW, EXPIRATION TIME OF SEARCH FOR CURRENT PATTERN SOUGHT. |
| TC | CURRENT (REAL) TIME, INCREMENTED 1 UNIT = 10 MS. FOR EVERY NEW AUTOCORRELATION INPUT FRAME ABOVE AMPLITUDE THRESHOLD. |
| THIRD | NEXTFR LOOP COUNTER, INCREMENTED WITH EACH LOOP FROM NEXTFR, AFTER THIRD LOOP, GO GET NEW INPUT FRAME. |
| THR | AMPLITUDE THRESHOLD, BELOW WHICH INPUT FRAME IS IGNORED |
| THRESH | PATTERN PARAMETER LIST ELEMENT: INDICATES LIKELIHOOD THRESHOLD FOR THAT PATTERN |
| TIMER | WDA ELEMENT: < TP OF PAT 1> + WDLMIN = EARLIEST ACCEPTABLE TIME FOR TOTAL WORD END |
| TOTIME | TOTAL REAL TIME DURATION OF DETECTED WORD |
| TP | WDA ELEMENT: TIME OF CURPAT PEAK LIKELIHOOD |
| TRKTIM | LENGTH OF INTERVAL FOR WHICH EACH PATTERN LIKELIHOOD PEAK IS TRACKED. |
| UNSAVE | SUBROUTINE TO RESTORE PREVIOUSLY SAVED VALUES OF REGISTERS 0-5. |
| VBA | VECTOR COMPUTER BUS ADDRESS REGISTER |
| V.C. | VECTOR COMPUTER (ABBREVIATION) |
| V.P. | VECTOR PROCESSOR (ABBREVIATION) |
| VPG | VECTOR COMPUTER PROGRAM COUNTER REGISTER |
| WD | WORD (ABBREVIATION) |
| WDA | WORD DESCRIPTOR ARRAY. ARRAY OF REFERENCE AND STATUS INFORMATION CONCERNING ONE OF THE TARGET WORDS. SEE DATA STRUCTURES SECTION. |
| WDAPTR | POINTER TO WORD DESCRIPTOR ARRAY OF WORD CURRENTLY SOUGHT. |
| WOLMIN | WDA ELEMENT: MINIMUM WORD LENGTH GIVEN IN # OF FRAMES. |
| WDPCNT | WDA ELEMENT: # OF PATTERN DETECTIONS COMPRISING A WORD DETECTION. |
| WDSTRT | WDA ELEMENT: FLAG SET IF FIRST PATTERN HAS BEEN FOUND FOR WORD SOUGHT, "WORD STARTED" |
| WINDOW | PATTERN PARAMETER LIST ELEMENT: # OF FRAMES TO END OF DETECTION WINDOW FOR NEXT PATTERN |
| W/ | WITH (ABBREVIATION) |

In view of the foregoing, it may be seen that several objects of the present invention are achieved and other advantageous results have been obtained.

It will be appreciated that the continuous speech recognition method described herein includes isolated speech recognition as a special application. Other application of the continuous speech method described herein, including additions, subtractions, deletions, and other modifications of the described preferred embodiment, will be obvious to those skilled in the art, and are within the scope of the following claims.

What is claimed is:

1. In a speech analysis system for recognizing at least one predetermined keyword in an audio signal, each said keyword being characterized by a template having at least one target pattern and each target pattern representing at least one short-term power spectrum, an analysis method comprising the steps of forming a sequence of electrical signals repesenting a sequence of selected patterns, identifying electrical signals representing a candidate keyword when said sequence of selected patterns corresponds respectively to the sequence of target patterns of said keyword template, normalizing electrical signals representing the time duration spacings between selected patterns corresponding to said candidate word, and applying a prosodic test to said normalized time duration spacings, wherein said normalized time duration spacings for a candidate word must meet the timing criteria imposed by said prosodic test before said candidate word is accepted as a recognized keyboard.

2. The method of claim 1 wherein said applying step comprises the step of applying fixed, predetermined spacing limits to each normalized spacing, whereby said normalized spacings must fall within said fixed limits before said candidate word is accepted.

3. The method of claim 1 wherein said applying step comprises the steps of applying a likelihood statistic function to said normalized spacings and accepting said candidate word if the likelihood statistic exceeds a predetermined minimum threshold.

4. The method of claim 1 further comprising the steps of applying a likelihood ratio test to said sequence of selected patterns corresponding to said candidate keyword to determine a figure of merit for each said pattern, accumulating said figures of merit for said patterns, and accepting said candidate word if said accumulated figure of merit exceeds a predetermined minimum value.

5. The method of claim 4 wherein said applying step comprises the steps of determining a best value of the log likelihood statistic for each of said selected patterns relative to any of said target patterns, said best values being designated the best general scores, determining the best value of the log likelihood statistic for each of said selected patterns relative to those target patterns which are valid alternatives for the corresponding target patterns of the candidate keyword, said best values being designated the best target scores, and determining a figure of merit for each selected pattern by generating the arithmetic difference of the best general score and the best target score for the selected pattern.

6. In a speech analysis system for recognizing at least one predetermined keyboard in an audio signal, each said keyword being characterized by a template having at least one target pattern, and each target pattern representing at least one short-term power spectrum, an analysis method comprising the steps of forming a sequence of electrical signals representing a sequence of selected patterns, identifying electrical signals representing a candidate keyword when said sequence of selected patterns corresponds respectively to the sequence of target patterns of a said keyword template, applying a likelihood ratio test to the electrical signals representing said sequence of selected patterns corresponding to said candidate word to determine a figure of merit for each said pattern, accumulating said figures of merit for said patterns, and accepting said candidate word as a recognized keyword if said accumulated figure of merit exceeds a predetermined minimum value.

7. The method of claim 6 wherein said applying step comprises the steps of determining a best value of the log likelihood statistic for each of said selected patterns relative to any of said target patterns, said best values being designated the best general scores, determining the best value of the log likelihood statistic for each of said selected patterns relative to those target patterns which are valid alternatives for the corresponding target patterns of the candidate keyword, said best values being designated the best target scores, and determining a figure of merit for each selected pattern by generating the arithmetic difference of the best general score and the best target score for the selected pattern.

8. In a speech analysis system in which an audio signal is spectrum analyzed for recognizing at least one predetermined keyword in a continuous audio signal, each said keyword being characterized by a template having at least one target pattern representing a plurality of short-term power spectra spaced apart in real time, an analysis method comprising the steps of repeatedly evaluating electrical signals representing a set of parameters determining a short-term power spectrum of said audio signal within each of a plurality of equal duration sampling intervals thereby to generate an uninterrupted time-ordered sequence of short-term audio power spectrum frames, repeatedly selecting from said sequence of frames, one first frame and at least one later occurring frame to form a multi-frame pattern, comparing each thus formed multi-frame pattern with each first target pattern of each keyword template, deciding whether each said multi-frame pattern corresponds to a first target pattern of a keyword template, for each multi-frame pattern which, according to said deciding step, corresponds to a said first target pattern of a potential candidate keyword, selecting later occurring short-term power spectra to form later occurring multi-frame patterns, deciding whether said later occurring multi-frame patterns correspond respectively to successive target patterns of said potential candidate keyword template, identifying electrical signals representing a candidate keyword template when said selected multi-frame patterns correspond respectively to the target patterns of a said keyword template, normalizing electrical signals representing the time duration spacings between multi-frame patterns corresponding to said candidate word, and applying a prosodic test to said normalized time duration spacings, wherein said normalized time duration spacings for a candidate word must meet the timing criteria imposed by said prosodic test before a said candidate word is accepted as a recognized keyword.

9. The method of claim 8 wherein said applying step comprises the step of applying fixed, predetermined spacing limits to each normalized spacing, whereby said normalized spacings must fall within said fixed time limits before said candidate word is accepted.

10. The method of claim 8 wherein said applying step comprises the steps of applying a likelihood statistic function to said normalized spacings and accepting said candidate word if the likelihood statistic exceeds a predetermined minimum threshold.

11. The method of claim 8 further comprising the steps of applying a likelihood ratio test to said sequence of multi-frame patterns corresponding to a candidate word to determine a figure of merit for each said pattern, accumulating said figures of merit for said patterns, and accepting said candidate word if said accumulated figure of merit exceeds a predetermined minimum value.

12. The method of claim 11 wherein said applying step comprises the steps of determining a best value of the log likelihood statistic for each of said selected multi-frame patterns relative to any of said target patterns, said best values being designated the best general scores, determining the best value of the log likelihood statistic for each of said selected multi-frame patterns relative to those target patterns which are valid alternatives for the corresponding target patterns of the candidate keyword, said best values being designated the best target scores, and determining a figure of merit for each selected multi-frame pattern by generating the arithmetic difference of the corresponding best general score and the best target score for the selected pattern.

13. In a speech analysis system in which an audio signal is spectrum analyzed for recognizing at least one predetermined keyword in a continuous audio signal, each said keyword being characterized by a template having at least one target pattern, said target pattern having an ordered sequence and each target pattern representing a plurality of short term power spectra spaced apart in real time, an analysis method comprising the steps of repeatedly evaluating electrical signals representing a set of parameters determining a short-term power spectrum of said audio signal within each of a plurality of equal duration sampling intervals thereby to generate a continuous time-ordered sequence of short-term audio power spectrum frames, repeatedly selecting from said sequence of frames, one first frame and at least one later occurring frame to form a multi-frame pattern, comparing each thus formed multi-frame pattern with each first target pattern of each keyword template, deciding whether each said multi-frame pattern corresponds to said first target pattern of a keyword template, for each multi-frame pattern which, according to said deciding step, corresponds to a said first target pattern of a potential candidate keyword, selecting later occurring short-term power spectra to form later occurring multi-frame patterns, deciding whether said later occurring multi-frame patterns correspond respectively to successive target patterns of said potential candidate keyword template, identifying electrical signals representing a candidate keyword template when said selected multi-frame patterns correspond respectively to the target patterns of a said keyword template, applying a likelihood ratio test to electrical signals representing said sequence of multi-frame patterns corresponding to a candidate word to determine a figure of merit for each said pattern, accumulating said figures of merit for said patterns, and accepting said candidate word if said accumulated figure of merit exceeds a predetermined minumum value.

14. The method of claim 13 wherein said applying step comprises the steps of determining a best value of the log likelihood statistic for each of said selected multi-frame patterns relative to any of said target patterns, said best values being designated the best general scores, determining the best value of the log likelihood statistic for each of said selected multi-frame patterns relative to those target patterns which are valid alternatives for the corresponding target patterns of the candidate keyword, said best values being designated the best target scores, and determining a figure of merit for each selected multi-frame pattern by generating the arithmetic difference of the corresponding best general score and the best target score for the selected pattern.

* * * * *

UNITED STATES PATENT AND TRADEMARK OFFICE
CERTIFICATE OF CORRECTION

PATENT NO. : 4,241,329
DATED : December 23, 1980
INVENTOR(S) : Lawrence G. Bahler and Stephen L. Moshier It is certified that error appears in the above-identified patent and that said Letters Patent are hereby corrected as shown below:

Col. 1, line 43, "keyboard" should read --keyword--.

Col. 2, line 2, "keyboard" should read --keyword--.

Col. 2, line 27, "milti-frame" should read --multi-frame--.

Col. 2, line 28, "keyboard" should read --keyword--.

Col. 2, line 56, "keyboard" should read --keyword--.

Col. 2, line 62, "keyboard" should read --keyword--.

Col. 3, line 36, "interals" should read --intervals--.

Col. 4, line 25, "progrem" should read --program--.

Col. 4, line 63, "certain" should read --carbon--.

Col. 4, line 67, "recognized" should read --recognizing--.

Col. 5, line 11, "keyboard" should read --keyword--.

Col. 5, line 21, "alalog" should read --analog--.

UNITED STATES PATENT AND TRADEMARK OFFICE
CERTIFICATE OF CORRECTION

PATENT NO. : 4,241,329
DATED : December 23, 1980
INVENTOR(S) : Lawrence G. Bahler and Stephen L. Moshier It is certified that error appears in the above-identified patent and that said Letters Patent are hereby corrected as shown below:

Col. 5, line 33, "valves" should read --values--.

Col. 5, line 61, "predetermined" should read --predicated--.

Col. 6, line 62, "digidal" should read --digital--.

Col. 6, line 66, insert --the-- before "multiplier".

Col. 6, line 67, "tekan" should read --taken--.

Col. 7, line 2, "high" should read --higher--.

Col. 7, line 4, "multiplies" should read --multiplied--.

Col. 7, line 14, insert --also-- between "As will" and "be".

Col. 7, line 22, "added" should read --adder--.

Col. 7, line 39, "shaft" should read --shift--.

Col. 8, line 60, insert --power-- between "point" and "spectrum".

UNITED STATES PATENT AND TRADEMARK OFFICE
CERTIFICATE OF CORRECTION

PATENT NO. : 4,241,329

DATED : December 23, 1980

INVENTOR(S) : Lawrence G. Bahler and Stephen L. Moshier

It is certified that error appears in the above-identified patent and that said Letters Patent are hereby corrected as shown below:

Col. 11, line 41, insert --transformed-- between "amplitude" and "power".

Col. 13, line 32, "unwarranged" should read --unwarranted--.

Col. 15, line 62, "x-x" should read --x-$\bar{x}$--.

Col. 20, Equation 12, "(1/n)} = p(x|m) · (1/n)" should read --1/n} = p(x|m) · 1/n--.

Col. 22, line 24, "written" should read --within---

Col. 23, line 58, "sotting" should read --spotting--.

Col. 23, line 64, "IWDSWN" should read --IWDSWM--.

Col. 24, line 9, "ade" should read --made--.

Col. 24, line 54, "constrains" should read --constraints--.

Col. 30, line 15, "socre" should read --score--.

Col. 30, line 15, "compilied" should read --compiled--.

UNITED STATES PATENT AND TRADEMARK OFFICE
CERTIFICATE OF CORRECTION

PATENT NO. : 4,241,329

DATED : December 23, 1980

INVENTOR(S) : Lawrence G. Bahler and Stephen L. Moshier

It is certified that error appears in the above-identified patent and that said Letters Patent are hereby corrected as shown below:

Col. 35, line 21 (Claim 1), "keyboard" should read --keyword--.

Col. 35, line 64 (Claim 6), "keyboard" should read --keyword--.

Col. 36, line 54 (Claim 8), insert --said-- "first"

Signed and Sealed this

Sixteenth Day of June 1981

[SEAL]

Attest:

RENE D. TEGTMEYER

Attesting Officer

Acting Commissioner of Patents and Trademarks